US011966093B2

(12) United States Patent
Geens et al.

(10) Patent No.: US 11,966,093 B2
(45) Date of Patent: Apr. 23, 2024

(54) TELECOMMUNICATIONS TERMINAL

(71) Applicant: COMMSCOPE TECHNOLOGIES LLC, Hickory, NC (US)

(72) Inventors: Johan Geens, Bunsbeek (BE); Pieter Doultremont, Kermt-Hasselt (BE); Philippe Coenegracht, Hasselt (BE)

(73) Assignee: CommScope Technologies LLC, Hickory, NC (US)

( * ) Notice: Subject to any disclaimer, the term of this patent is extended or adjusted under 35 U.S.C. 154(b) by 449 days.

(21) Appl. No.: 17/259,115

(22) PCT Filed: Jul. 9, 2019

(86) PCT No.: PCT/US2019/040979
§ 371 (c)(1),
(2) Date: Jan. 8, 2021

(87) PCT Pub. No.: WO2020/014210
PCT Pub. Date: Jan. 16, 2020

(65) Prior Publication Data
US 2021/0271043 A1 Sep. 2, 2021

Related U.S. Application Data

(60) Provisional application No. 62/695,647, filed on Jul. 9, 2018, provisional application No. 62/748,087, filed on Oct. 19, 2018, provisional application No. 62/833,074, filed on Apr. 12, 2019.

(51) Int. Cl.
*G02B 6/00* (2006.01)
*G02B 6/44* (2006.01)

(52) U.S. Cl.
CPC ......... *G02B 6/4444* (2013.01); *G02B 6/4471* (2013.01)

(58) Field of Classification Search
CPC .......................... G02B 6/4444; G02B 6/4471; G02B 6/44465; G02B 6/44515; G02B 6/00
See application file for complete search history.

(56) References Cited

U.S. PATENT DOCUMENTS

| | | | |
|---|---|---|---|
| 5,975,769 | A | 11/1999 | Larson |
| 7,013,074 | B2 | 3/2006 | Battey et al. |
| 7,120,347 | B2 | 10/2006 | Blackwell, Jr. et al. |
| 7,302,152 | B2 | 11/2007 | Luther et al. |
| 7,333,708 | B2 | 2/2008 | Blackwell, Jr. et al. |
| 7,512,304 | B2 | 3/2009 | Gronvall et al. |

(Continued)

FOREIGN PATENT DOCUMENTS

| | | |
|---|---|---|
| CN | 101713852 A | 5/2010 |
| WO | 2015/183630 A1 | 12/2015 |

(Continued)

OTHER PUBLICATIONS

International Search Report and Written Opinion of the International Searching Authority for International Patent Applicationi No. PCT/US2019/040979 dated Oct. 25, 2019, 14 pages.

(Continued)

*Primary Examiner* — Jennifer Doan
(74) *Attorney, Agent, or Firm* — MERCHANT & GOULD P.C.

(57) ABSTRACT

Aspects of the present disclosure relate to a telecommunications terminal including fiber optic adapter carriers and/or modules that mount to a main body of the terminal.

23 Claims, 29 Drawing Sheets

(56) References Cited

U.S. PATENT DOCUMENTS

| | | | |
|---|---|---|---|
| 7,539,387 | B2 | 5/2009 | Mertesdorf et al. |
| 7,558,458 | B2 | 7/2009 | Gronvall et al. |
| 7,740,409 | B2 | 6/2010 | Bolton et al. |
| 7,753,596 | B2 | 7/2010 | Cox |
| 7,805,044 | B2 | 9/2010 | Reagan et al. |
| 7,869,681 | B2 | 1/2011 | Battey et al. |
| 8,213,760 | B2 | 7/2012 | Rudenick et al. |
| 8,414,196 | B2 | 4/2013 | Lu et al. |
| 8,805,152 | B2 * | 8/2014 | Smith .............. G02B 6/4471 385/135 |
| 8,837,940 | B2 | 9/2014 | Smith et al. |
| 2009/0148118 | A1 | 6/2009 | Gronvall et al. |
| 2011/0013875 | A1 | 1/2011 | Bran De Leon et al. |
| 2012/0257862 | A1 | 10/2012 | Deel |
| 2018/0106974 | A1 | 4/2018 | Smith et al. |

FOREIGN PATENT DOCUMENTS

| | | |
|---|---|---|
| WO | 2016/205340 A1 | 12/2016 |
| WO | 2017/046190 A2 | 3/2017 |
| WO | 2017/202797 A1 | 11/2017 |
| WO | 2018149913 A1 | 8/2018 |
| WO | 2018149917 A1 | 8/2018 |
| WO | 2018/197410 A1 | 11/2018 |
| WO | 2019/209645 A1 | 10/2019 |
| WO | 2020/081942 A1 | 4/2020 |

OTHER PUBLICATIONS

Extended European Search Report for European Patent Application No. 19834218.0 dated Mar. 2, 2022, 5 pages.

* cited by examiner

TELECOMMUNICATIONS TERMINAL

CROSS-REFERENCE TO RELATED APPLICATIONS

This application is a National Stage Application of PCT/US2019/040979, filed on Jul. 9, 2019, which claims the benefit of U.S. patent application Ser. No. 62/695,647, filed on Jul. 9, 2018, and claims the benefit of U.S. patent application Ser. No. 62/748,087, filed on Oct. 19, 2018, and claims the benefit of U.S. patent application Ser. No. 62/833,074, filed on Apr. 12, 2019, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to enclosures used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors and fiber optic enclosures are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, connection fields/panels, connectorized pigtails, wavelength divisional multi-plexers and other components.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter. The fiber optic adapter can include an alignment sleeve for receiving and co-axially aligning the ferrules of the two mated connectors. The alignment sleeve can take the form of a cylindrical split sleeve having a resilient/elastic construction. Example fiber optic connectors are disclosed at U.S. Pat. No. 8,837,940.

Many fiber optic enclosures are designed to be installed in outside environments and are environmentally sealed. Example fiber optic enclosures for use in outside environments are disclosed by U.S. Pat. Nos. 7,512,304; 7,558,458; 8,213,760; 7,805,044; 7,539,387; and 7,013,074. A typical fiber optic enclosure of this type includes at least one sealed cable port for routing a fiber optic network cable into the enclosure. This type of enclosure can also include sealed connector ports for interfacing with connectorized drop cables. Optical fibers of the fiber optic network cable routed into the enclosure are often accessed within the enclosure and spliced to another cable such as a drop cable, directly connectorized or spliced to connectorized pigtails. When the fibers are connectorized, the connectorized ends can be plugged into inner ends of fiber optic adapters incorporated into the sealed connector ports. The fiber optic adapters can include alignment sleeves and are installed at the sealed connector ports at the time the enclosure is initially assembled. In the field, outer ends of the fiber optic adapters can be used to receive ruggedized fiber optic connectors corresponding to drop cables to provide optical connections between the drop cables and optical fibers of the fiber optic network cable without having to access an interior of the enclosure.

SUMMARY

One aspect of the present disclosure relates to a telecommunications terminal including a housing having a first housing piece and a second housing piece that mate together when in a closed position to define an interior of the housing. The first and second housing pieces are also movable relative to one another from the closed configuration to an open configuration to allow the interior of the housing to be accessed. The second housing piece defines at least one opening. The terminal housing also includes an adapter carrying piece to which a plurality of hardened fiber optic adapters are secured. The adapter carrying piece is attached to the second housing piece over the opening of the second housing piece by a permanent, non-unitary connection.

Another aspect of the present disclosure relates to a telecommunications terminal including a terminal housing. The telecommunications terminal also includes a fiber optic adapter secured to the terminal housing. The fiber optic adapter has a first port accessible from outside the terminal housing and a second port positioned inside the terminal housing. The first port is a hardened port. The telecommunications terminal also includes a first fiber optic cable routed into the terminal housing. The first fiber optic cable is a tether cable having a free end outside the terminal housing. The free end includes a hardened fiber optic connector. The telecommunications terminal also includes a second fiber optic cable routed into the terminal housing. The second fiber optic cable includes at least one optical fiber connected to the fiber optic adapter and at least one optical fiber connected to the tether cable.

Another aspect of the present disclosure relates to an enclosure including a module holder sealingly mounted to a housing at an aperture so that the module holder extends at least partially into the interior of the housing through the aperture. The housing defines a separate input from the aperture. The module holder defines a pocket having an open end. The module holder carries a connection interface disposed within the pocket and accessible from an exterior of the housing through the open end of the pocket. The connection interface can be one or more adapter ports, one or more plug connectors, or one or more connectorized stub cables. The connection interface may be ruggedized. A module can be installed at the module holder. The module carries output connection interfaces and an input connection interface, which communicatively couples to the connection interface within the pocket. When a module is not installed, a cover may mount to the module holder to seal the pocket and/or block access to the connection interface.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
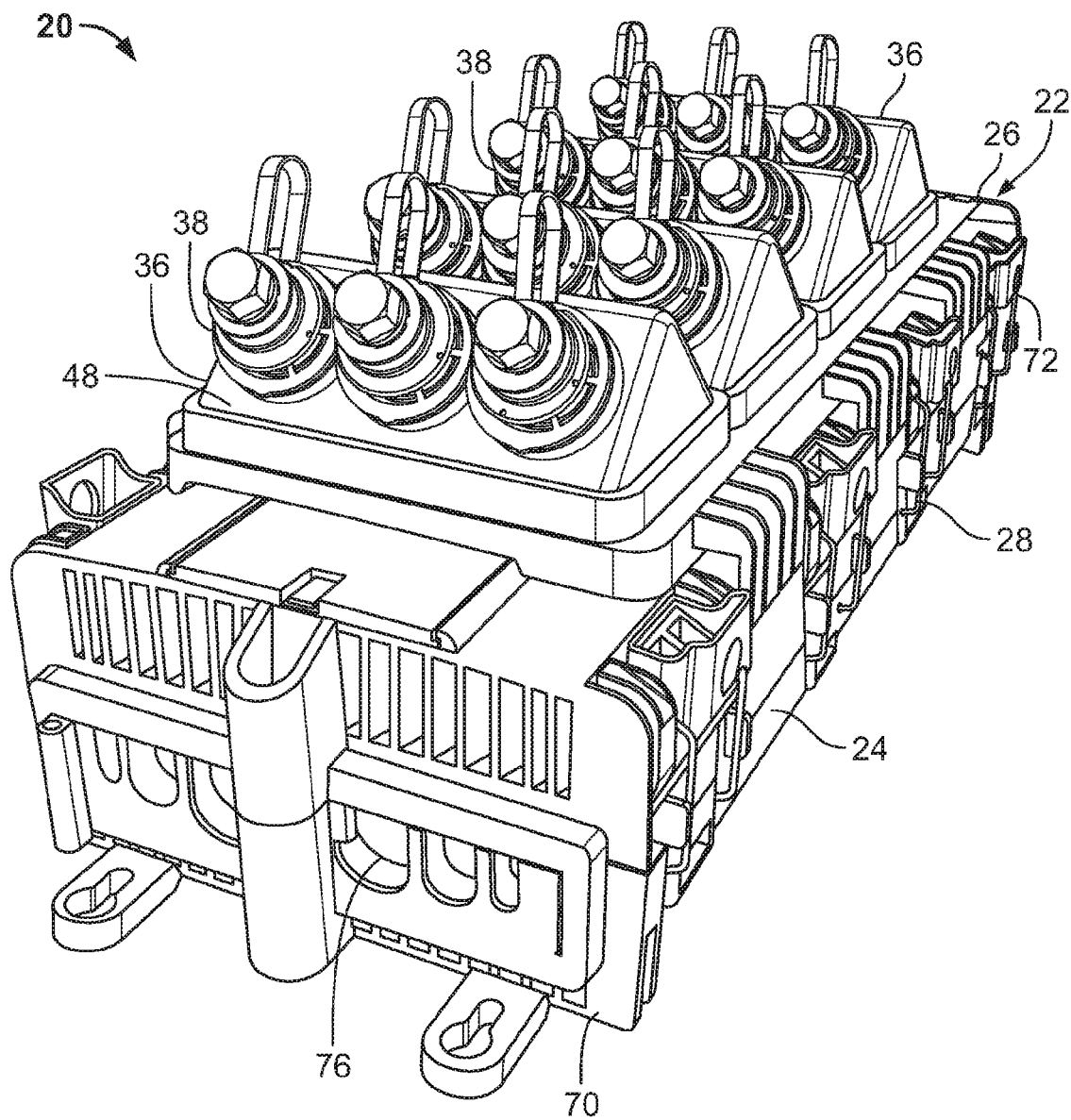
FIG. 1 is a perspective view of a telecommunications terminal in accordance with the principles of the present disclosure.

FIG. 1 depicts a telecommunications terminal 20 in accordance with the principles of the present disclosure. The telecommunications terminal 20 includes a housing 22 including a first housing piece 24 and a second housing piece 26. The first and second housing pieces 24, 26 mate together when in a closed configuration (as shown at FIG. 1) to define an interior of the housing 22. The first and second housing pieces 24, 26 are preferably movable relative to one another from the closed configuration to an open configuration to allow the interior of the housing to be accessed. In certain examples, the first and second housing pieces 24, 26 can be connected by a hinge that allows the first and second housing pieces 24, 26 to be pivoted between the closed configuration and the open configuration. In certain examples, a seal such as a gasket seal or other type of perimeter seal can be provided between the first and second housing pieces 24, 26 to provide environmental sealing when the housing 22 is in the closed configuration. In certain examples, the housing 22 can include latches 28 for retaining the housing 22 in the closed position. By opening the latches 28, the housing 22 can be moved from the closed configuration to the open configuration.

In the depicted example, the first housing piece 24 is a base and the second housing piece 26 is front cover. In certain examples, the first housing piece 24 defines a back plane adapted to face toward a structure to which the terminal 20 is intended to be mounted. In certain examples, the second housing piece 26 can define a front of the terminal 20. In certain examples the first housing piece 24 can include structure for mounting the terminal 20 to another structure (e.g., a pole, a wall, within a hand-hole, to a frame, or to other locations.) Example mounting structures can include openings for receiving fasteners, mounting tabs defining fastener openings, brackets, structures for receiving brackets, strap receivers, and like structures.

Figure 2:
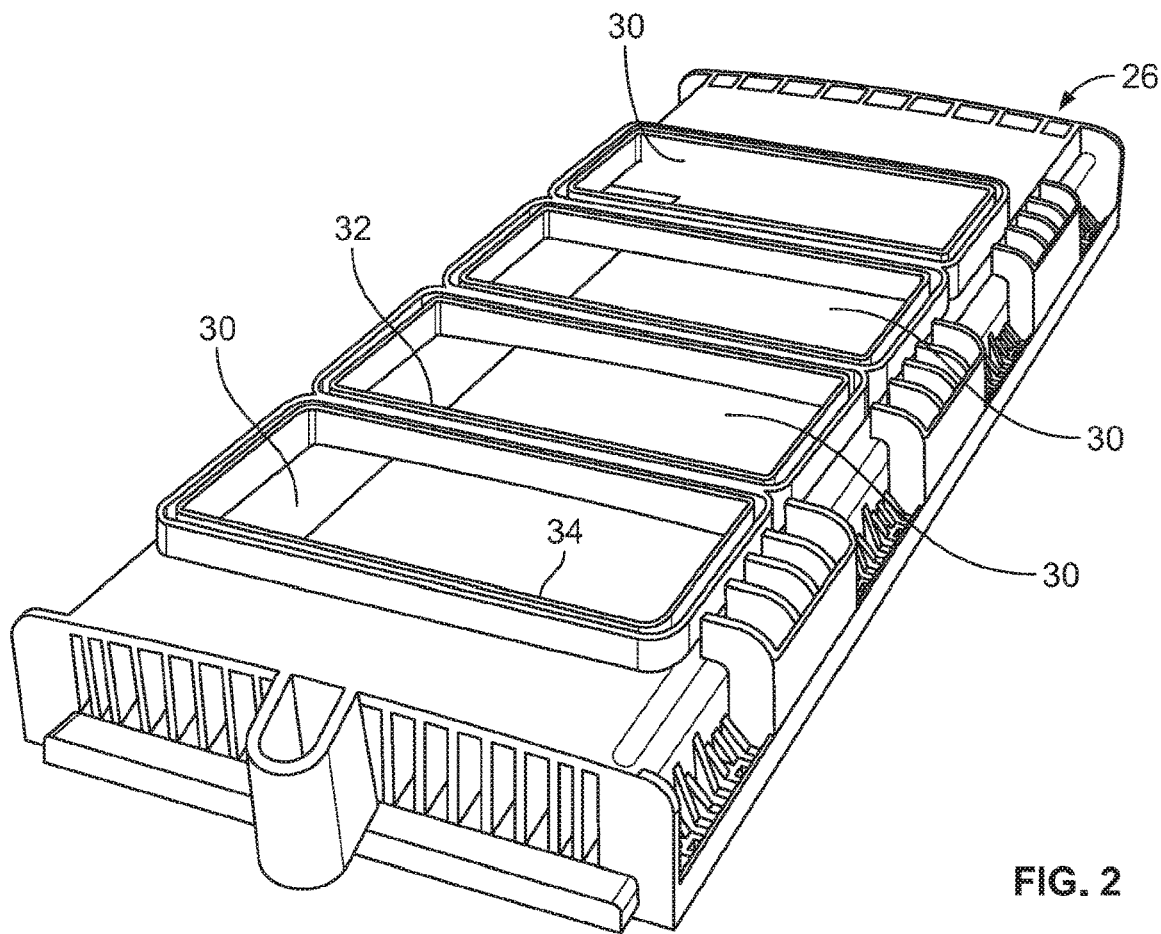
FIG. 2 is a perspective view of a front cover of the telecommunications terminal of FIG. 1.
Figure 3:
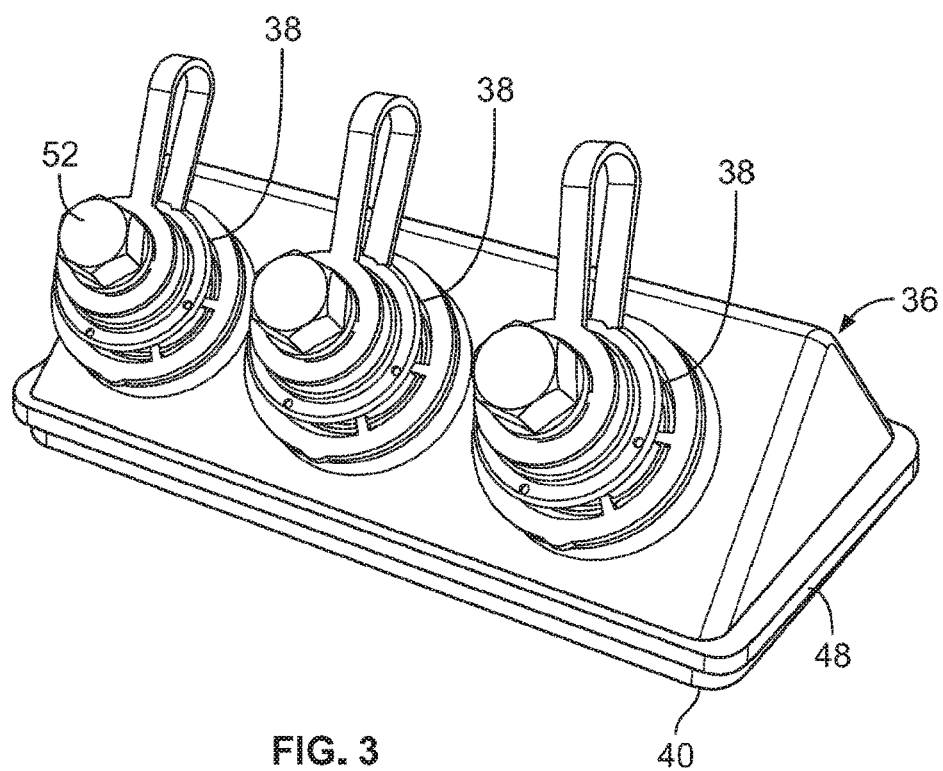
FIG. 3 is a perspective view of an adapter carrying piece that mounts to the front cover of the telecommunications terminal of FIG. 1.

FIG. 2 depicts the second housing piece 26. As depicted at FIG. 2, the second housing piece 24 forms the front cover of the housing 24 and defines at least one opening such as a front opening 30. As depicted, the second housing piece 26 defines a plurality of front openings 30 such as four front openings 30. The front openings 30 are each defined by a generally rectangular perimeter 32. Mounting channels 34 are defined within the rectangular perimeters 32 and preferably extend around each of the front openings 30. As depicted, the perimeters 32 of the front openings 30 are aligned along a plane that is generally parallel to the back plane of the terminal 20 when the second housing piece 26 is mounted on the first housing piece 24 as shown at FIG. 1.

Referring to FIG. 1, the terminal 20 further includes a plurality of adapter carrying pieces 36 (e.g., adapter mounting pieces, adapter modules, adapter housing pieces, etc.) to which a plurality of hardened fiber optic adapters 38 are secured. The adapter carrying pieces 36 are attached to the second housing piece 26 over the openings of the second housing piece 26 by permanent, non-unitary connections. Each of the adapter carrying piece 36 is separately connected to the second housing piece 26 by a separate permanent, non-unitary connection. Example permanent, non-unitary connections include adhesive bonding, heat sealing, welding (e.g., ultrasonic welding, laser welding, hot gas welding) and the like. Once the adapter carrying pieces 36 have been attached to the second housing piece 26, the adapter carrying pieces 36 are integrated with the second housing piece 26 and not intended to be removed. In certain examples, the adapter carrying pieces 36 can include mounting projections or extensions 40 that that coincide generally with the perimeters of the openings 30 and are configured to fit within the channels 34 to facilitate aligning the adapter carrying pieces 36 relative to the front openings 30. It will be appreciated that separate ones of the adapter carrying pieces 36 are provided for each of the front openings 30.

By non-unitary, it is meant that the main body of the housing is not monolithically formed with the adapter carrying pieces 36 (i.e., the adapter carrying pieces are not unitarily molded in a one-piece, seamless construction with the second housing piece 26). Instead, the seamed, permanent connections are made between the main body of the housing and the adapter carrying pieces.

Figure 16:
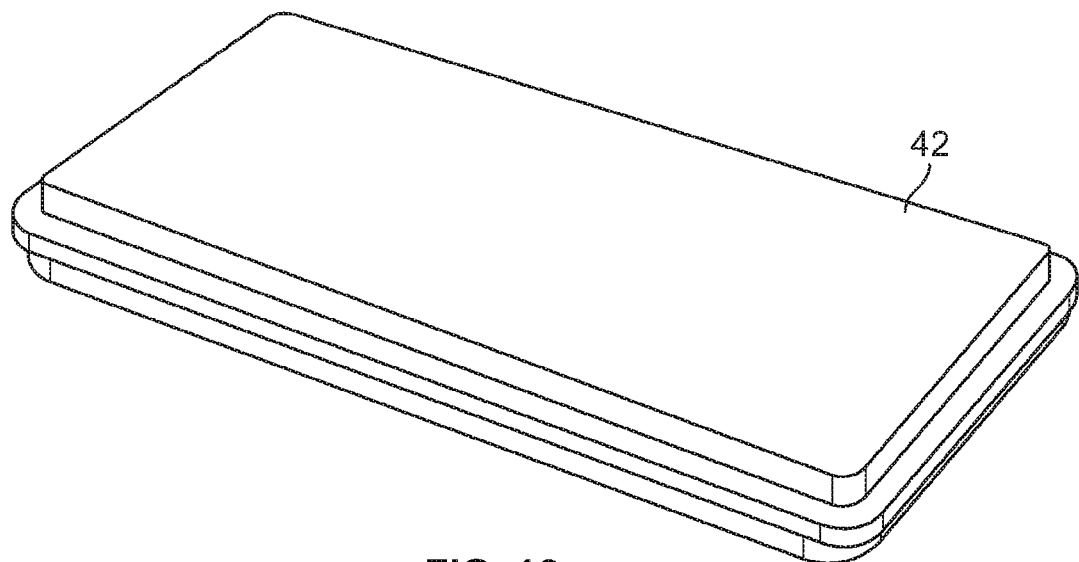
FIG. 16 shows a blank plate suitable for use with the telecommunications terminal of FIG. 1.

In alternative examples, blanks 42 (see FIG. 16) can be mounted over the front openings 30 by permanent, non-unitary connections. It will be appreciated that the blanks can include the same type of connection interface as the adapter carrying pieces 36. It will be appreciated that by using blanks, housings having reduced port counts can be manufactured using the same base components of the first housing piece and the second housing piece 24, 26. Additionally, it will be appreciated that other adapter carrying pieces 36 having different sizes and styles of fiber optic adapters can also be used to allow different terminals to be manufactured from the same base components of the first and second housing pieces 24, 26.

In certain examples, the permanent, non-unitary connection corresponding to each of the adapter carrying pieces 36 includes a seam that extends about the perimeter of the given adapter carrying piece 36 and about the perimeter of the opening at which the adapter carrying piece is mounted. Each seam mechanically attaches each adapter carrying piece 36 to the second housing piece 26 and provides a fluid tight connection between each adapter carrying piece 36 and the second housing piece 26.

Figure 4:
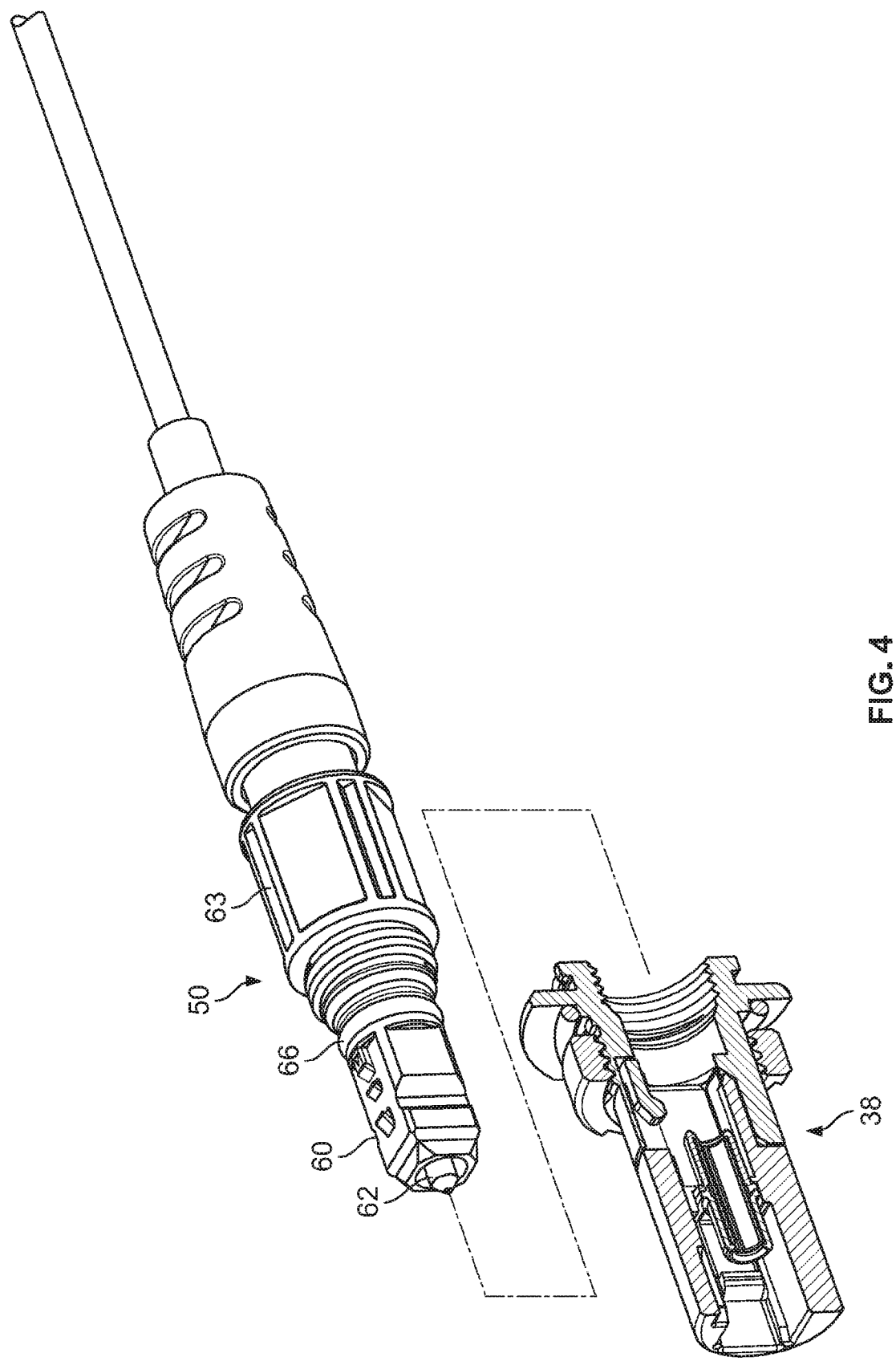
FIG. 4 shows an example hardened fiber optic adapter and a mating hardened fiber optic connector.
Figure 5:
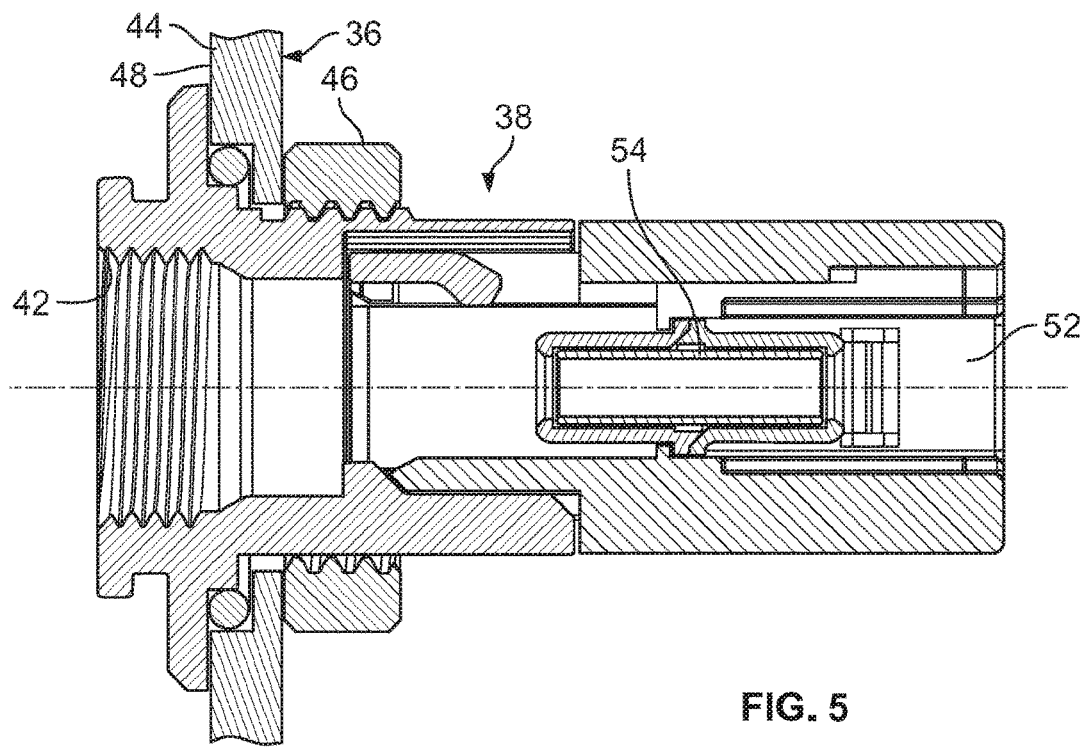
FIG. 5 is a cross-sectional view of the hardened fiber optic connector of FIG. 4.

FIG. 5 illustrates an example configuration for one of the hardened fiber optic adapters 38. The hardened fiber optic adapter 38 is shown mounted to a wall 44 of the adapter carrying piece 36 by a fastener such as a nut 46. In other examples, the hardened fiber optic adapter 38 can be bonded to the wall 44, unitarily formed with the wall or otherwise attached to the wall 44. The wall 44 defines an outer face 48. The hardened fiber optic adapter 38 includes a hardened outer port 42 located at the outer face 48. The hardened outer port 42 is accessible from outside the housing 22 and is configured for receiving a hardened fiber optic connector 50 (see FIG. 4). The hardened outer port 42 can include a mechanical connection interface having a robust configuration. Example mechanical connection interfaces can include twist-to-lock interfaces such as threaded interfaces and bayonet-style interfaces. The hardened outer port 42 can also include a seal or a sealing surface for providing a sealed connection when the hardened fiber optic connector 50 is installed within the hardened outer port 42. Plugs 52 (see FIG. 1) can be used to close and seal the hardened outer ports 42 when hardened fiber optic connectors 50 are not loaded therein.

In certain examples, the hardened fiber optic adapters 38 are sealed relative to the wall 44 of the adapter carrying piece 36. In certain examples, the wall 44 defines the planar outer face 48 at which the hardened outer ports 42 are located. In certain examples, the hardened outer ports are arranged in rows.

Referring again to FIG. 5, the hardened fiber optic adapter 38 also includes an inner port 52 which is positioned inside interior of the housing 22. In certain examples, the inner port 52 is adapted for receiving a non-hardened fiber optic connector located inside the housing 22. In certain examples, the hardened fiber optic adapter 38 can include a ferrule alignment structure such as a ferrule alignment sleeve 54 which is coaxial alignment with the hardened outer port 42 and the inner port 52. In certain examples, the ferrule alignment sleeve 54 is adapted for coaxially aligning a ferrule of the hardened fiber optic connector 50 received within the hardened outer port 42 with the ferrule of a non-hardened fiber optic connector received within the inner port 52.

Referring to FIG. 4, the hardened fiber optic connector 50 includes a connector body or plug 60 supporting a ferrule 62 which supports an end portion of an optical fiber. A twist-to-lock fastener 63 such as a threaded fastener or a bayonet-style fastener is mounted on the connector body and is configured to be rotated/turned relative to connector body about a central axis of the fiber optic connector 50. The fiber optic connector 50 can further include a seal 66 that provides an environmental seal between the hardened fiber optic adapter 38 and the exterior of the connector body 60 when the hardened fiber optic connector 50 is installed within the hardened outer port 42.

It will be appreciated that each of the adapter carrying pieces 36 can be attached over the front openings 30 in at least two different orientations. For example, each of the adapter carrying pieces 36 can be attached to the second housing piece 26 over a corresponding one of the openings 30 in a first orientation in which the outer ports 42 of the fiber optic adapters 38 face in a first direction. Additionally, each of the adapter carrying pieces 36 can also be attached to the second housing piece 26 over a corresponding one of the openings 30 in a second orientation in which the hardened outer ports 42 face in a direction different from the first direction. In one example, the first and second orientations are rotated 180 degrees relative to one another. In certain examples, first and second directions are 90 degrees apart from one another.

Referring back to FIG. 1, the housing 22 includes first and second opposite ends 70, 72. The adapter carrying pieces 36 include the outer faces 48 that are depicted as being planar. The faces 48 can be defined by the walls 44. The fiber optic adapters 38 are mounted at the faces 48. In certain examples, when the adapter carrying pieces 36 are mounted to the second housing piece 26, the faces 48 are angled relative to the front of the housing 22 and/or the back plane of the housing 22 such that the outer ports 42 of the hardened fiber optic adapters 38 face at least partially toward one of the first and second opposite ends 70, 72. As shown at FIG. 1, the faces 74 are all oriented to face at least partially toward the first end 70.

Referring to FIG. 1, the first end 70 defines a plurality of cable pass-through locations 76 for allowing fiber optic cables to be routed into the interior of the housing 22. The cable pass-through locations 76 preferably include a sealing material such as a sealing gel or other type of sealant for sealing about the cables with respect the housing 22. In certain examples, the faces 48 are oblique relative to the front of the housing 22 and/or are oblique relative to the back plane of the housing 22. In certain examples, the faces 48 are angled about 45 degrees relative to the front of the housing and/or to the back plane of the housing. In certain examples, the perimeters of the front openings 30 are oriented along a plane that is parallel to the front of the housing and/or parallel to the back plane of the housing.

It will be appreciated that the ability to mount the adapter carrying pieces 36 in the different orientations allows the adapter carrying pieces 36 to be selectively secured to the second housing piece 26 with the ports 42 facing at least partially toward the first end 70 of the housing 22 or with the ports 42 facing at least partially toward the second end 72 of the housing 22. Therefore, the ability to mount the adapter carrying pieces 36 in different orientations on the housing 22 allows different housing configurations to be constructed from the same base components (i.e., the first and second housing pieces 24, 26 and the adapter carrying pieces 36).

In certain examples, the hardened fiber optic adapter carriers 36 include molded plastic pieces or housings to which the hardened fiber optic adapters 38 are secured. In certain examples, the first and second housing pieces 24, 26 are separately molded plastic pieces.

Figure 6:
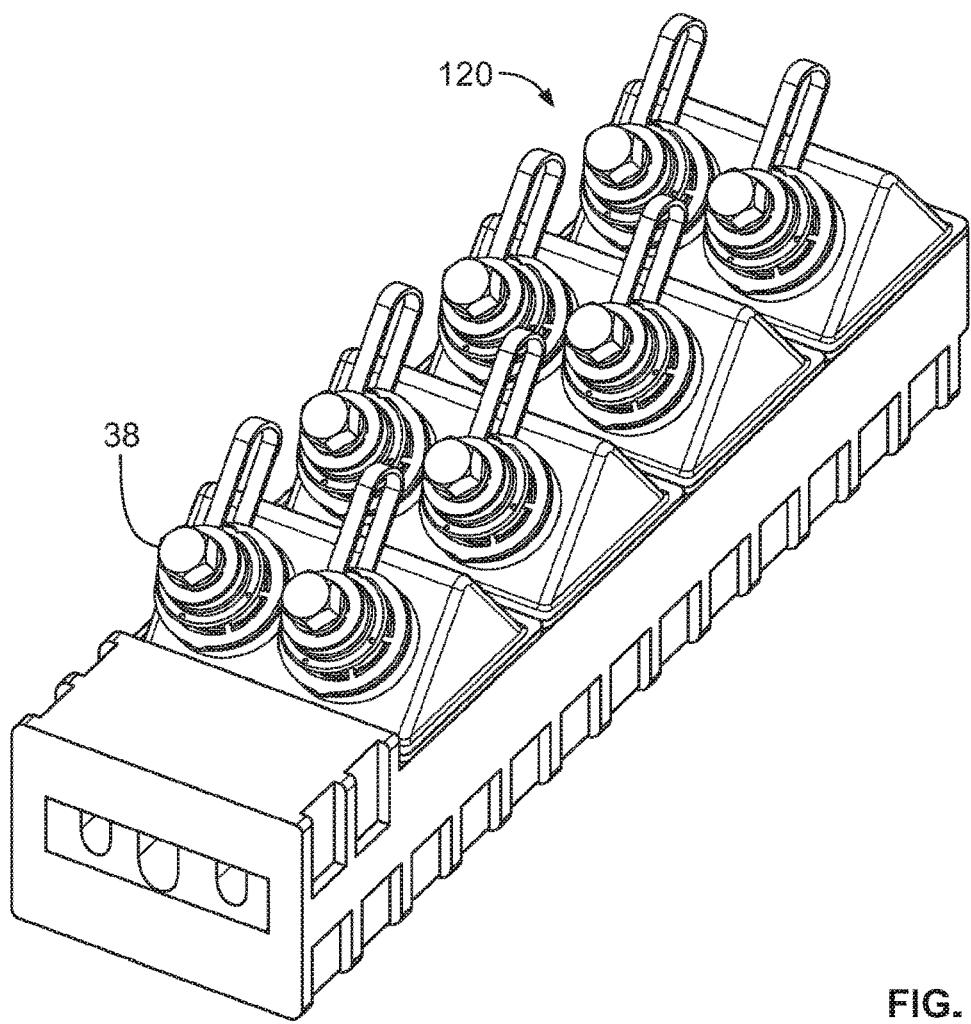
FIG. 6 is a perspective view of another telecommunications terminal in accordance with the principles of the present disclosure.
Figure 7:
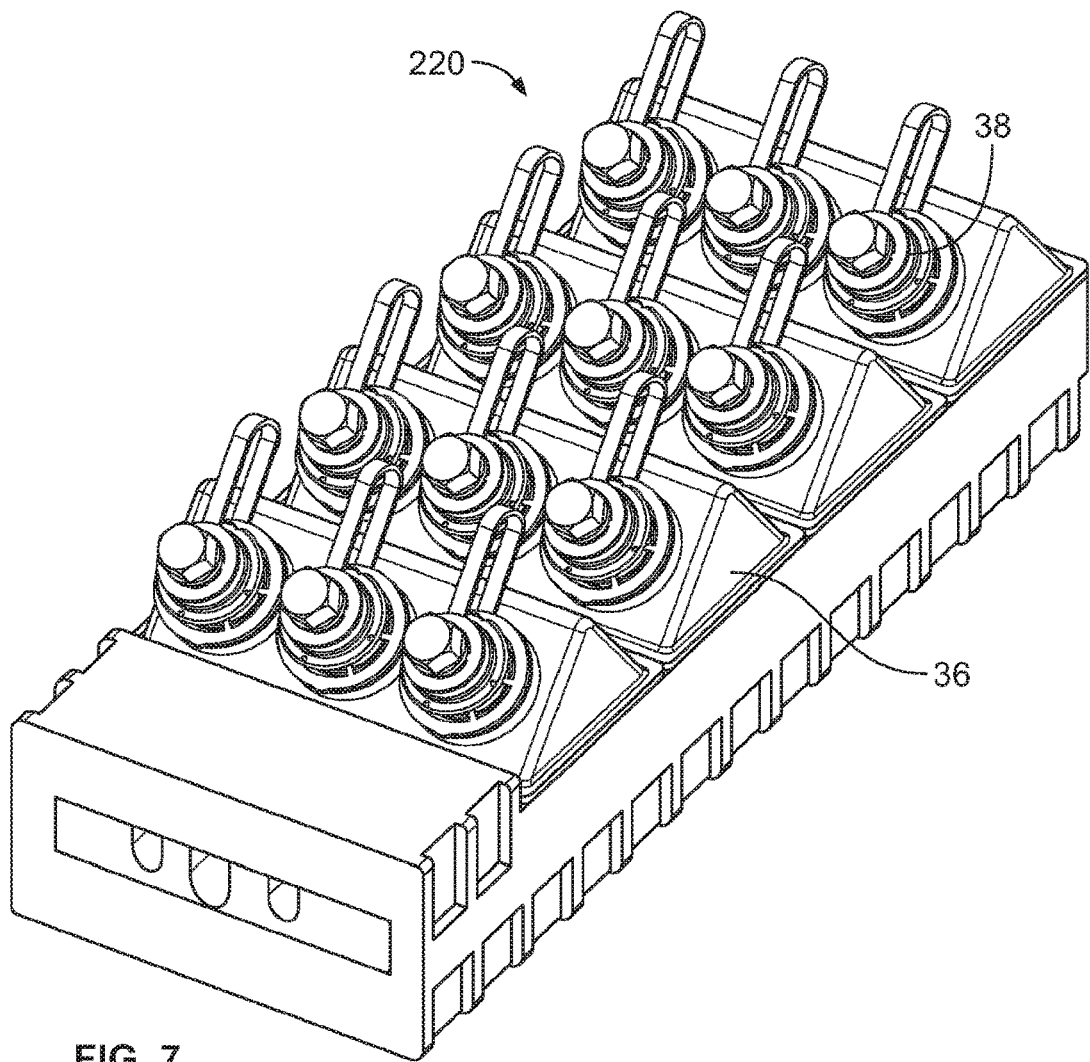
FIG. 7 is a perspective view of another telecommunications terminal in accordance with the principles of the present disclosure.

FIG. 6 shows an alternative telecommunications terminal 120 having the same basic configuration as the telecommunications terminal 20 except only two hardened fiber optic adapters 38 are provided per row. FIG. 7 shows another version of a telecommunications terminal 220 having adapter carrying pieces 36 each carrying three hardened fiber optic adapters 38. It will also be appreciated that a front 221 of a housing 223 of the terminal 220 defines separate openings corresponding to each of the adapter carrying pieces 36. For any example disclosed herein, it will be appreciated that blanks can be used to reduce the number of ports provided on the enclosure.

Figure 8:
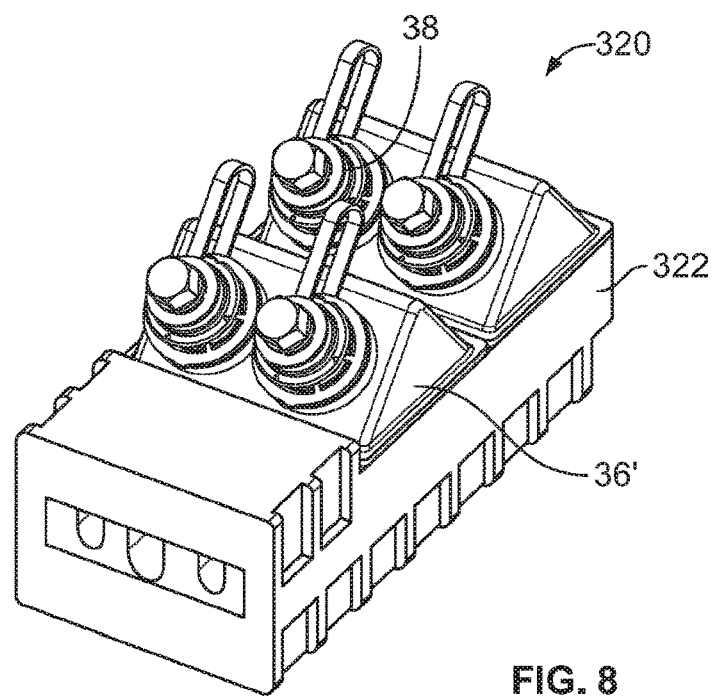
FIG. 8 is a perspective view of still another telecommunications terminal in accordance with the principles of the present disclosure.

FIG. 8 shows further telecommunications terminal 320 in accordance with the principles of the present disclosure. The terminal 320 includes a housing 322 having a main body defining two front openings each covered by a corresponding adapter carrying piece 36' each including two of the hardened fiber optic adapters 38. In the depicted example, the openings and thus the adapter carrying pieces 36' covering the openings are at a front of the housing 322. The adapter carrying pieces 36' are each secured to the main body of the housing by a permanent, non-unitary connection. Thus, similar to the previous examples, the adapter carrying pieces 36 are not unitary/monolithic with the main body of the housing.

Once again blanks can be used to cover selected one of the housing openings if fewer than four ports are desired. Additionally, adapter carrying pieces having hardened fiber optic adapter with different form factors, ports sizes and/or styles can be used to provide different terminal configurations having adapter ports that are compatible with different styles/types of fiber optic connectors.

Figure 9:
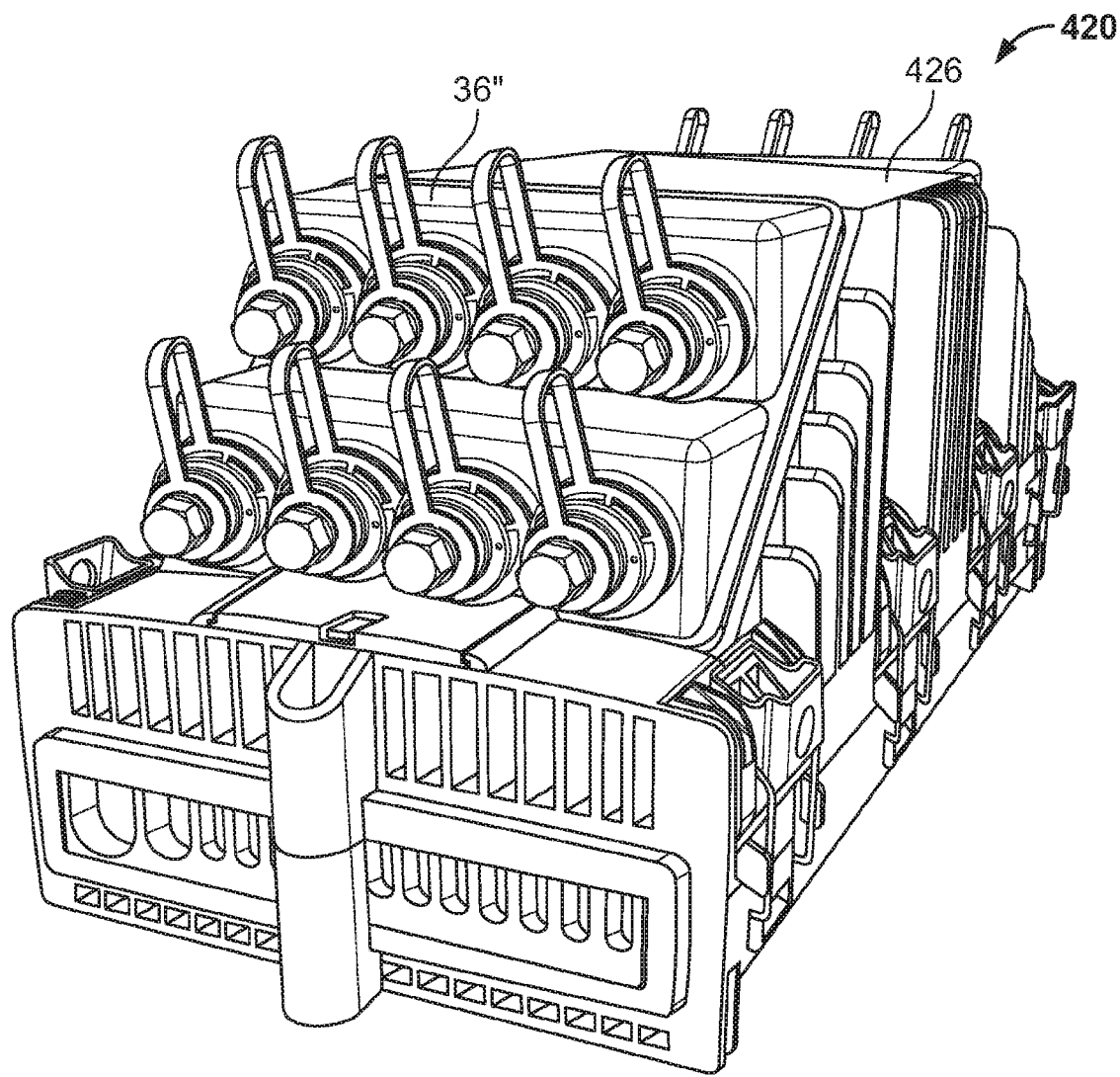
FIG. 9 is a perspective view of a further telecommunications terminal in accordance with the principles of the present disclosure.

FIG. 9 shows a further telecommunications enclosure 420 in accordance with the principles of the present disclosure. In the example of FIG. 9, a front cover 426 defines separate openings which are respectively covered by separate adapter carrying pieces 36". The perimeters of the front openings are aligned along a plane that is oblique relative to the front of the terminal housing and/or oblique relative to the back plane of the terminal housing. The faces 48 of the adapter carrying pieces 36" are oriented perpendicular relative to the front of the terminal housing and/or the back plane of the terminal housing. Center axes of the hardened fiber optic adapters 38 are arranged parallel relative to the back plane of the terminal housing. The hardened outer ports 42 of the hardened fiber optic adapters 38 are shown facing in the same direction as the cable pass-through openings defined between the base and the front cover of the housing. By mounting the adapter carriers 36 in the opposite orientation, the outer ports of the fiber optic adapters can be oriented to face forwardly with axes of the fiber optic adapters arranged perpendicular to a rear plane of the terminal.

Figure 11:
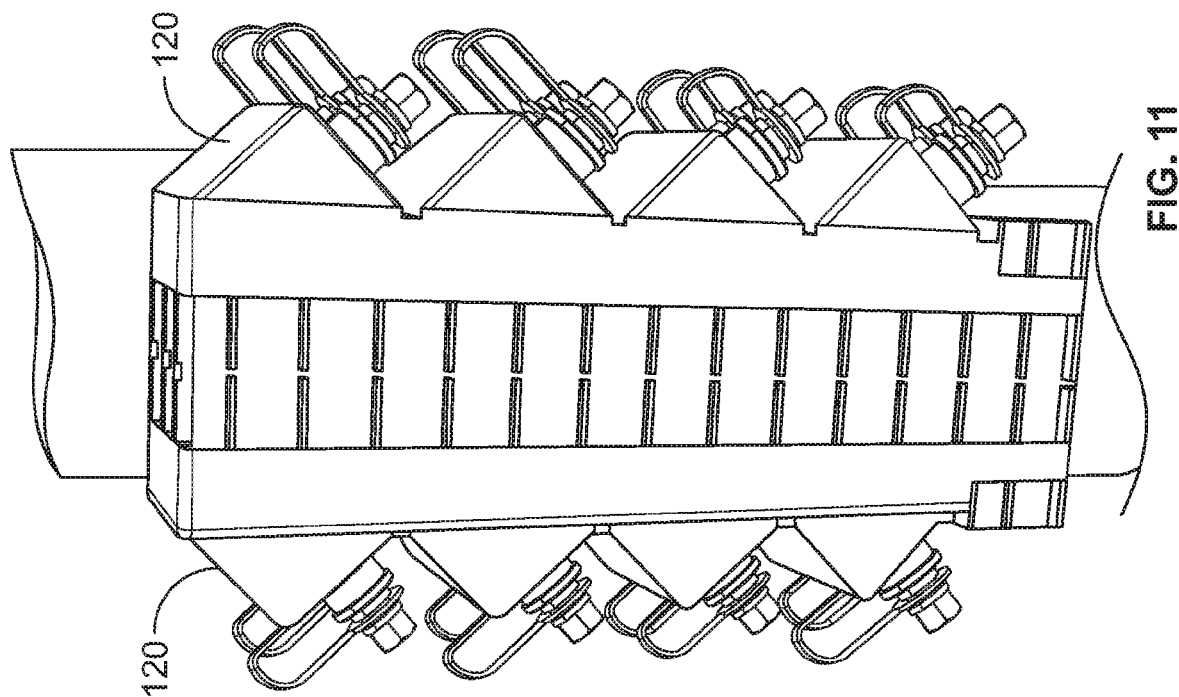
FIG. 11 shows two telecommunications terminals in accordance with the principles of the present disclosure arranged in a back-to-back configuration.
Figure 10:
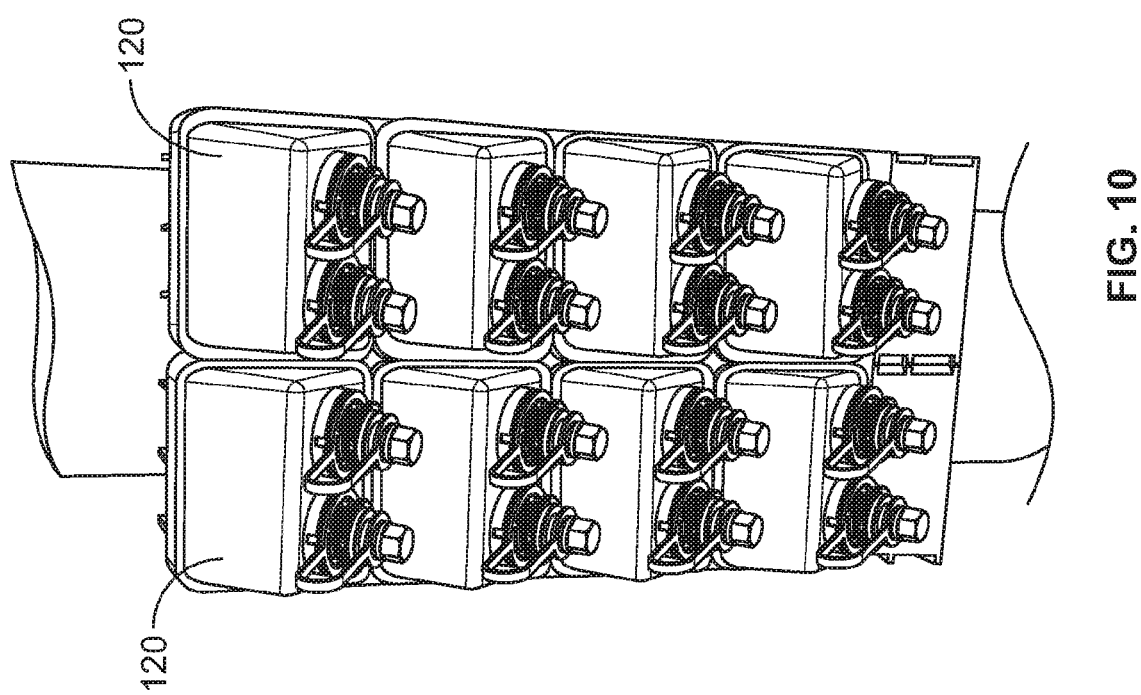
FIG. 10 shows two telecommunications enclosures in accordance with the principles of the present disclosure arranged in a side-by-side configuration.

FIG. 10 shows telecommunications terminals 120 in accordance with the principles of the present disclosure arranged in a side-by-side relationship and secured to a mounting structure such as a pole. FIG. 11 shows telecommunications terminals 120 in accordance with the principles of the present disclosure mounted in a back-to-back relation and secured to a mounting structure such as a pole.

Example hardened fiber optic adapters and hardened fiber optic connectors are disclosed in U.S. Pat. No. 8,414,196, which is hereby incorporated by reference in its entirety. Example indexing configurations are disclosed by U.S. Pat. No. 9,348,096, which is hereby incorporated by reference in its entirety.

Figure 12:
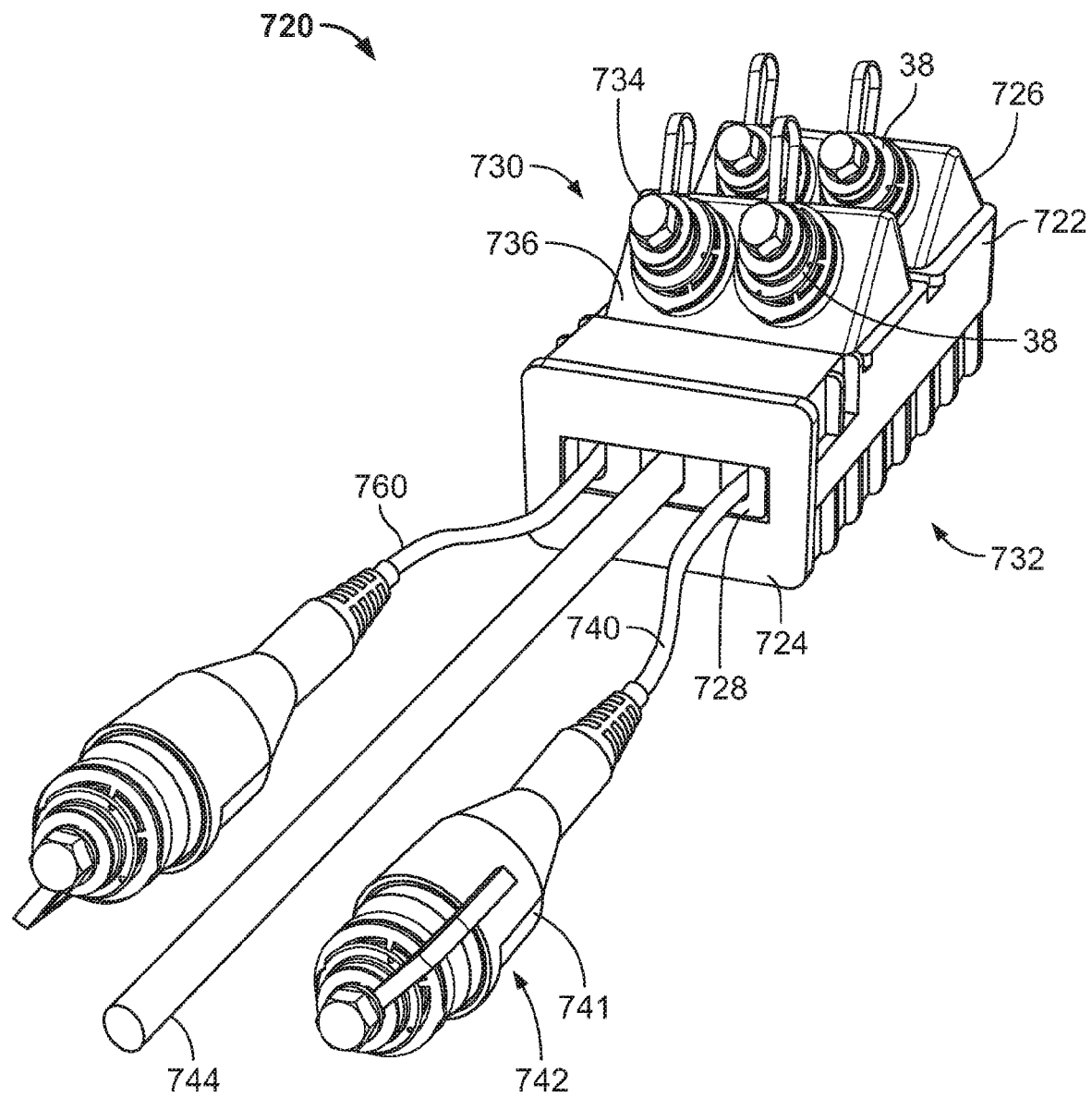
FIG. 12 depicts a telecommunications enclosure in accordance with the present disclosure including at least one fiber optic tether cable.

FIG. 12 shows another telecommunications terminal 720 in accordance with the principles of the present disclosure. The telecommunications terminal 720 includes a terminal housing 722 having first and second opposite ends 724, 726. The first end 724 defines a plurality of cable pass-through locations 728. The cable pass-through locations 728 are preferably defined at least in part by a sealing material such as a gel or elastomeric material within the terminal housing 722. The terminal housing 722 also includes a front side 730 and a back side 732. Steps 734 are provided at the front side 730. The steps include adapter mounting surfaces 736 that are angled to face at least partially toward the first end 724 of the terminal housing 722. Hardened fiber optic adapters 38 are mounted at the adapter mounting surfaces 736. The hardened outer ports 42 of the hardened fiber optic adapters 38 face at least partially toward the first end 724 of the terminal housing 722. The inner ports 52 of the hardened fiber optic adapters 38 are positioned inside the terminal housing 722 and the hardened outer ports 42 of the hardened fiber optic adapters 38 are accessible from outside the terminal housing 722. The hardened fiber optic adapters 42 are attached directly to the terminal housing 722.

The terminal 720 also includes a first fiber optic cable 740 routed into the terminal housing 722 through one of the cable pass-through locations 728. The first fiber optic cable 740 is tether cable having a free end 741 outside the terminal housing 722. The free end 741 includes a hardened fiber optic connector 742. The hardened fiber optic connector 741 is preferably a multi-fiber fiber optic connector, but could also be a single fiber optical connector. The hardened fiber optic connector 742 can be a male fiber optic connector or a female fiber optic connector. In certain examples, the hardened fiber optic connector 742 includes a twist-to-lock interface such as a threaded interface or a bayonet-style interface for connecting to a corresponding coupling element of a fiber optic connector or adapter configured to mate with the hardened fiber optic connector 742. In certain examples, the hardened fiber optic connector 742 is sealed by a plug or cap prior to connecting to its mating fiber optic connector. In certain examples, when the hardened fiber optic connector 742 is connected to a corresponding fiber optic connector, a sealed relationship exists between the two mated fiber optic connectors.

The terminal 720 further includes a second fiber optic cable 744 routed into the terminal housing 722 through one of the cable pass-through locations 728. The second fiber optic cable 744 includes one or more optical fibers that are preferably connected to the fiber optic adapters 38, and also includes one or more optical fibers that are connected to the first fiber optic cable 740. In certain examples, the first fiber optic cable 740 has a length less than or equal to one meter. In certain examples, the second fiber optic cable 744 is substantially longer than the first fiber optic cable 740. In certain examples, the second fiber optic cable 744 is at least ten meters, or at least 25 meters, or at least 50 meters, or at least 100 meters in length.

Figure 13:
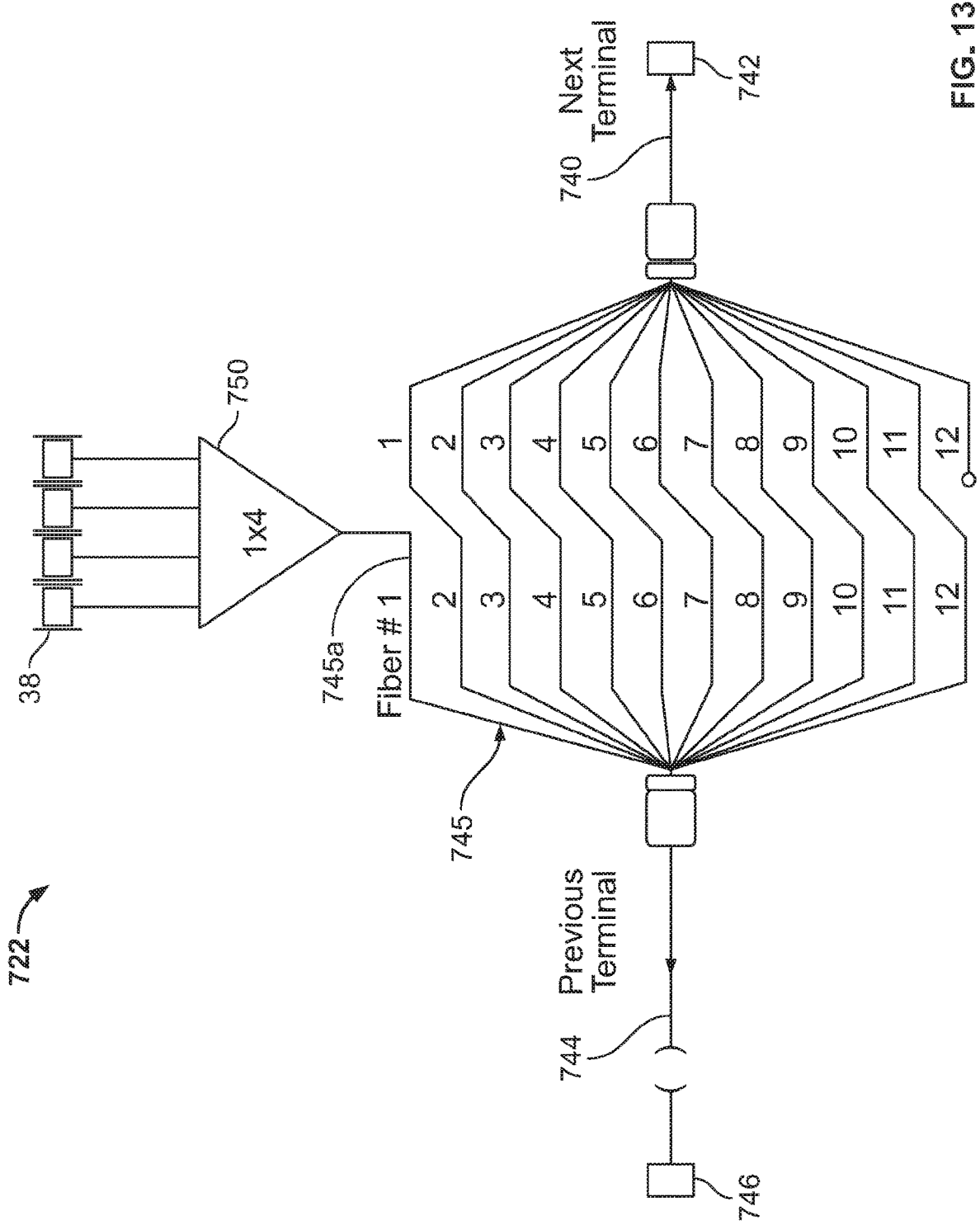
FIG. 13 is an example fiber indexing architecture that is usable with the telecommunications terminal of FIG. 12.

FIG. 13 shows an example fiber routing configuration for the telecommunications terminal 720. The second fiber optic cable 744 is shown including twelve optical fibers 745. The second fiber optic cable 744 includes a free end having a multi-fiber fiber optic connector 746. The twelve optical fibers 745 have ends terminated at twelve fiber positions arranged in a row at the multi-fiber fiber optic connectors 746. A first one 745a of the optical fibers 745 is dropped off at the terminal housing 722 and connected to the input side of a passive optical power splitter 750. The passive optical power splitter 750 has outputs that connect to the fiber optic adapters 38 (e.g., the outputs are terminated by fiber optic connectors that are inserted into the inner ports of the fiber optic adapters 38). The remaining eleven optical fibers 745 are routed to the first fiber optic cable 740. Ends of optical fibers 2-12 from the second fiber optic cable 744 can be positioned at positions 1-11 of the hardened fiber optic connector 742. In certain examples, position 1 of the hardened fiber optic connector 742 can be optically connected to another tether 760 (see FIG. 12) routed through one of the cable pass-through locations 728 of the terminal housing 722.

Figure 14:
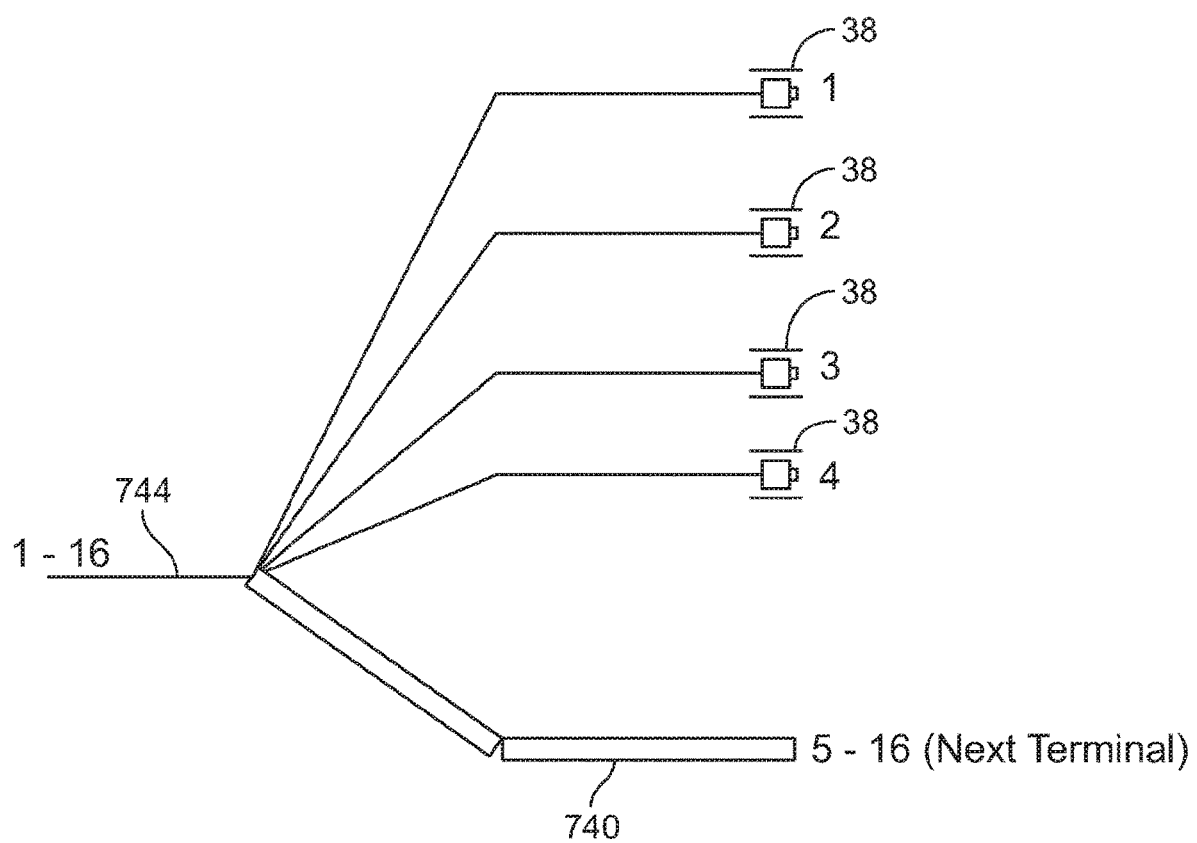
FIG. 14 illustrates an example fiber expansion architecture that is usable with the telecommunications terminal of FIG. 12.

FIG. 14 shows another fiber routing architecture suitable for use with the terminal housing 722. In this architecture, the second fiber optic cable 744 includes sixteen optical fibers. At the terminal housing 722, four of the optical fibers are coupled to the adapters 38 of the terminal housing 722. The remaining twelve optical fibers are routed through the first fiber optic cable 740 and coupled to the hardened fiber optic connector 742, or spliced to corresponding fibers of the cable 740 that are coupled to the fiber optic connector 742. In this way, the twelve remaining fibers are coupled to the first fiber optic cable 740 and the first fiber optic cable 740 can be used to provide expansion from the terminal 720 to a subsequent terminal.

Figure 15:
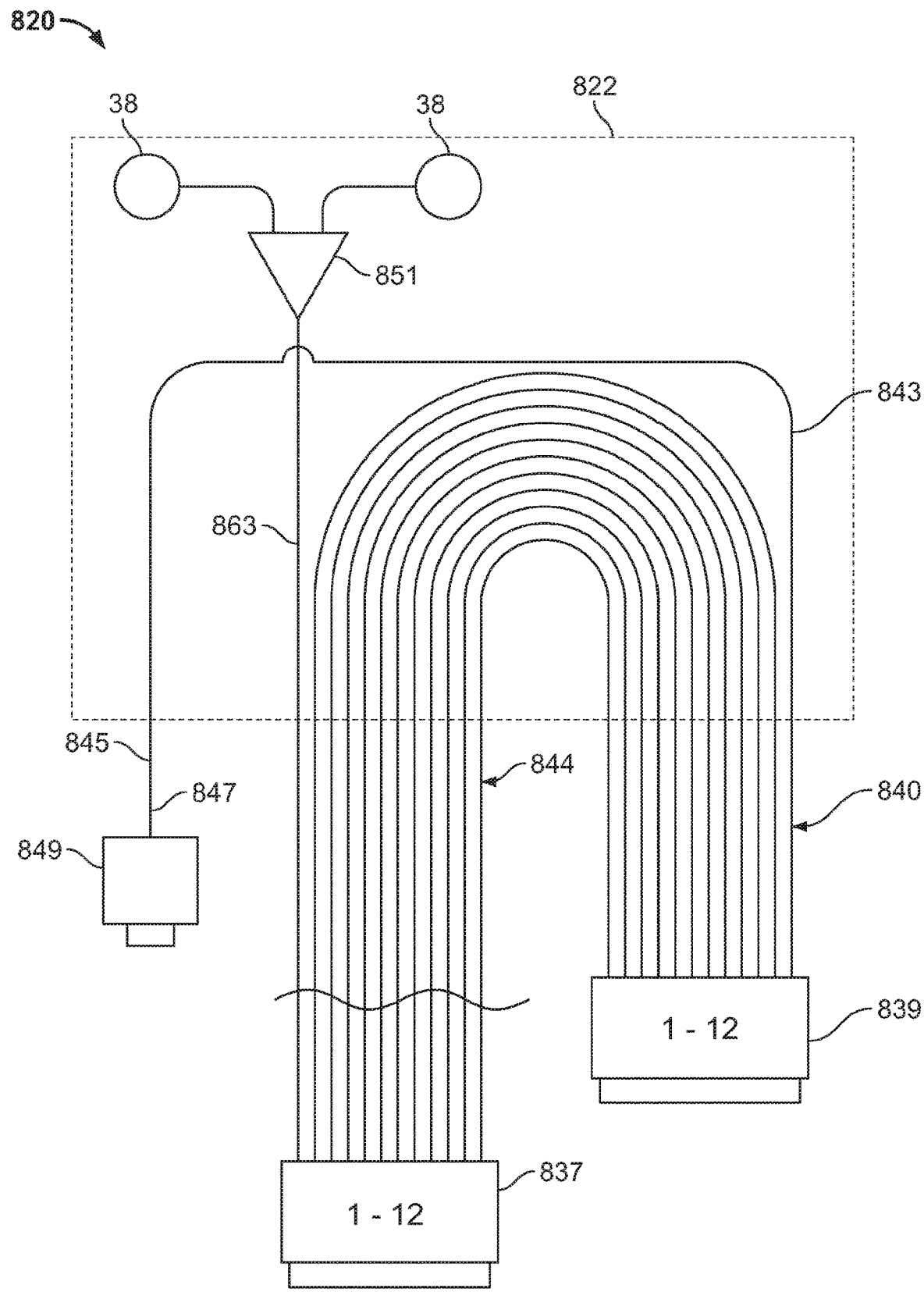
FIG. 15 schematically depicts another telecommunications terminal in accordance with the principles of the present disclosure.

FIG. 15 shows another telecommunications terminal 820 in accordance with the principles of the present disclosure. The telecommunications terminal 820 includes a terminal housing 822. A first multi-fiber fiber optic cable 840 forms a tether that extends outwardly from the terminal housing 822. The tether 840 preferably has a length less than about one meter. A second fiber optic cable 844 also extends outwardly from the terminal housing 722. The second cable 844 has a length greater than 10 meters. In certain examples, the fiber optic cables 840, 844 extend through sealed pass-through openings defined through the terminal housing 722. In certain examples, the fiber optic cables 840, 844 are both multi-fiber fiber optic cables. In certain examples, each of the fiber optic cables 840, 844 has a free end terminated by a hardened multi-fiber optical connector. In certain examples, the second fiber optic cable 844 is substantially longer than the first fiber optic cable 840.

In certain examples, a plurality of signal transmission paths extending through second fiber optic cable 844 (e.g., paths defined by one or more optical fibers which may be spliced together or otherwise coupled together) are routed through the first fiber optic cable 840 and preferably the signal transmission paths are indexed between the positions of a multi-fiber fiber optic connector 837 of the second fiber optic cable 844 and a multi-fiber fiber optic connector 839 of the first fiber optic cable 840. As depicted, transmission paths corresponding to positions 2-12 of the multi-fiber connector 837 are routed through cables 844, 840 and are indexed to positions 1-11 of the multi-fiber connector 839. Position 12 of the connector 839 is connected by an optical transmission path 843 to a second tether 845 that projects outwardly from the housing 822. In certain examples, the second tether 845 is less than one meter in length and has a free end 847 terminated by a hardened fiber optic connector 849 such as a multi-fiber fiber optic connector or a single-fiber fiber optic connector. As depicted, the second tether 845 includes a single optical transmission path and is terminated by a single-fiber fiber optic connector. In other examples, the optical optical fiber/transmission path 843 from the first fiber optic cable 840 can be split within the terminal housing 822 by a passive optical power splitter 823 and the outputs from the passive optical power splitter can be routed through the second tether 845 to a multi-fiber fiber optical connector at the free end of the second tether. The first optical transmission path 863 of the second fiber optic cable 844 is routed to the input side of a passive optical power splitter 851 (e.g., a 1×2 splitter). Outputs from the passive optical power splitter 851 are routed to non-hardened fiber optic connectors that are inserted within the inner ports of hardened fiber optic adapters 38 attached directly to the terminal housing 822. In the depicted example, the terminal 820 includes only 2 fiber optic adapters 38 attached directly to the terminal housing 822.

FIGS. 17-20 illustrate another example terminal 520 in accordance with the principles of the present disclosure. The telecommunications terminal 520 includes a housing 522 defining an interior 523. The housing 522 includes a first side 542. The telecommunications enclosure 520 also includes a plurality of fiber optic adapters 538 positioned at the first side 542 of the housing 522. The fiber optic adapters 538 have ruggedized outer ports fixed relative to the first side 542 of the housing 522. The ruggedized outer ports are accessible from outside the housing 522 at the first side 542 of the housing 522.

In an example, the first side 542 of the housing 522 defines a bottom of the terminal 520. The housing 522 also has a top 544, a first side 546, a second side 548, a front 541, and a rear 543.

The housing 522 optionally includes ears, tabs, fastener openings or other structure for allowing the housing to be mounted via fasteners to a mounting structure such as a pole, wall or the like. The housing 522 optionally includes a mechanical interface (e.g., a snap-fit structure; rails, a latch or latches, a catch or catches, a slot or slots; a track or tracks; a receptacle or receptacles; fastener openings, etc.) for attaching a mounting bracket to the housing 522, wherein the mounting bracket includes structure for facilitating mounting the housing to a mounting structure such as a pole, wall or the like.

In certain examples, the housing 522 of the telecommunications enclosure 520 can include a mechanical coupling interface for attaching another housing of a second telecommunications enclosure (e.g., another terminal 520) to the housing 522 of the first telecommunications enclosure 520. In certain examples, the mechanical coupling interface will be provided at the front side 541 of the housing 522 of the telecommunications enclosure 520. In certain examples, the housing 522 can include the mechanical coupling interface at its rear side sized and shaped to mate with the mechanical coupling interface at the front side 541 of another such housing 522 to allow a plurality of the housings 522 to be coupled together is a stacked configuration, or to allow a mounting bracket equipped with the mechanical coupling interface to be mounted to the rear side 543 of the housing 522.

The housing 522 defines an opening 530 at the bottom 542. The opening 530 is defined by a generally rectangular perimeter 532. A mounting channel 534 is defined within the rectangular perimeter 532 and preferably extends around the opening 530. As depicted, the perimeter 532 of the opening 530 is aligned along a plane that is not parallel to a back plane (i.e., a plane aligned along the back 544) of the terminal 520. In certain examples, the perimeter 532 is aligned along a plane that is angled relative to the back plane at a non-perpendicular angle. In certain examples, the plane of the opening 530 is angled between about 30° and about 60° relative to the back plane. In certain examples, the plane of the opening 530 is angled between about 40° and about 50° relative to the back plane. In certain examples, the plane of the opening 530 is angled between about 30° and about 50° relative to the back plane. In certain examples, the plane of the opening 530 is angled between about 40° and about 60° relative to the back plane. In certain examples, the plane of the opening 530 is angled between about 30° and about 70° relative to the back plane. In certain examples, the plane of the opening 530 is angled between about 20° and about 60° relative to the back plane. In an example, the opening 530 is angled about 45° relative to the back plane.

The terminal 520 further includes an adapter carrying piece 536 (e.g., adapter mounting piece, adapter module, adapter housing piece, etc.) to which a plurality of hardened fiber optic adapters 538 are secured. The adapter carrying piece 536 is attached to the housing 522 over the opening 530 by permanent, non-unitary connections (e.g., see FIG. 20). The adapter carrying piece 536 is separately connected to the housing 522 by a separate permanent, non-unitary connection. Example permanent, non-unitary connections include adhesive bonding, heat sealing, welding (e.g., ultrasonic welding, laser welding, hot gas welding) and the like. Once the adapter carrying piece 536 has been attached to the housing 522, the adapter carrying piece 536 is integrated with the housing 522 and not intended to be removed. In certain examples, the adapter carrying piece 536 can include a mounting projection or extension 540 that that coincides generally with the perimeter of the opening 530 and is configured to fit within the channel 534 to facilitate aligning the adapter carrying piece 536 relative to the opening 530.

By non-unitary, it is meant that the main body of the housing 522 is not monolithically formed with the adapter carrying piece 536 (i.e., the adapter carrying piece is not unitarily molded in a one-piece, seamless construction with the housing 522). Instead, the seamed, permanent connections are made between the main body of the housing 522 and the adapter carrying piece 536.

Figure 17:
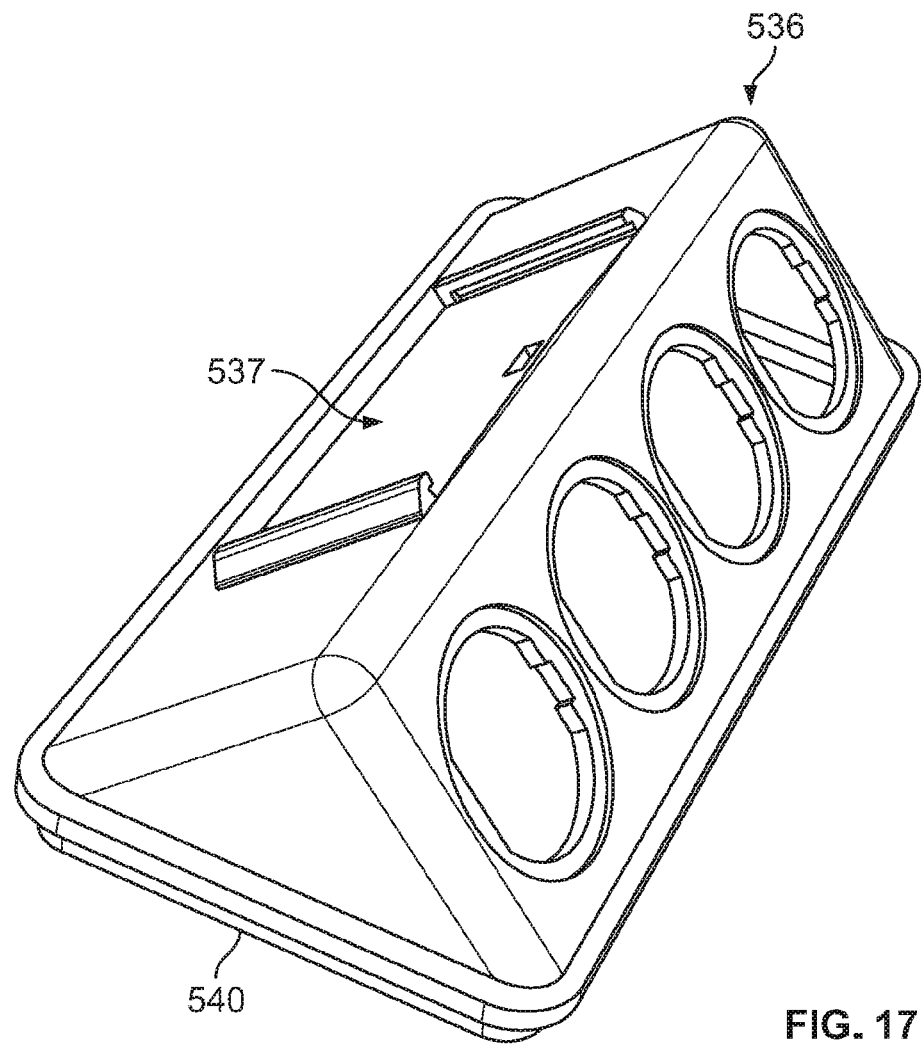
FIG. 17 is a perspective view of an example adapter carrying piece that mounts to the front cover of the telecommunications terminal of FIG. 1 shown without the adapters mounted thereon.
Figure 18:
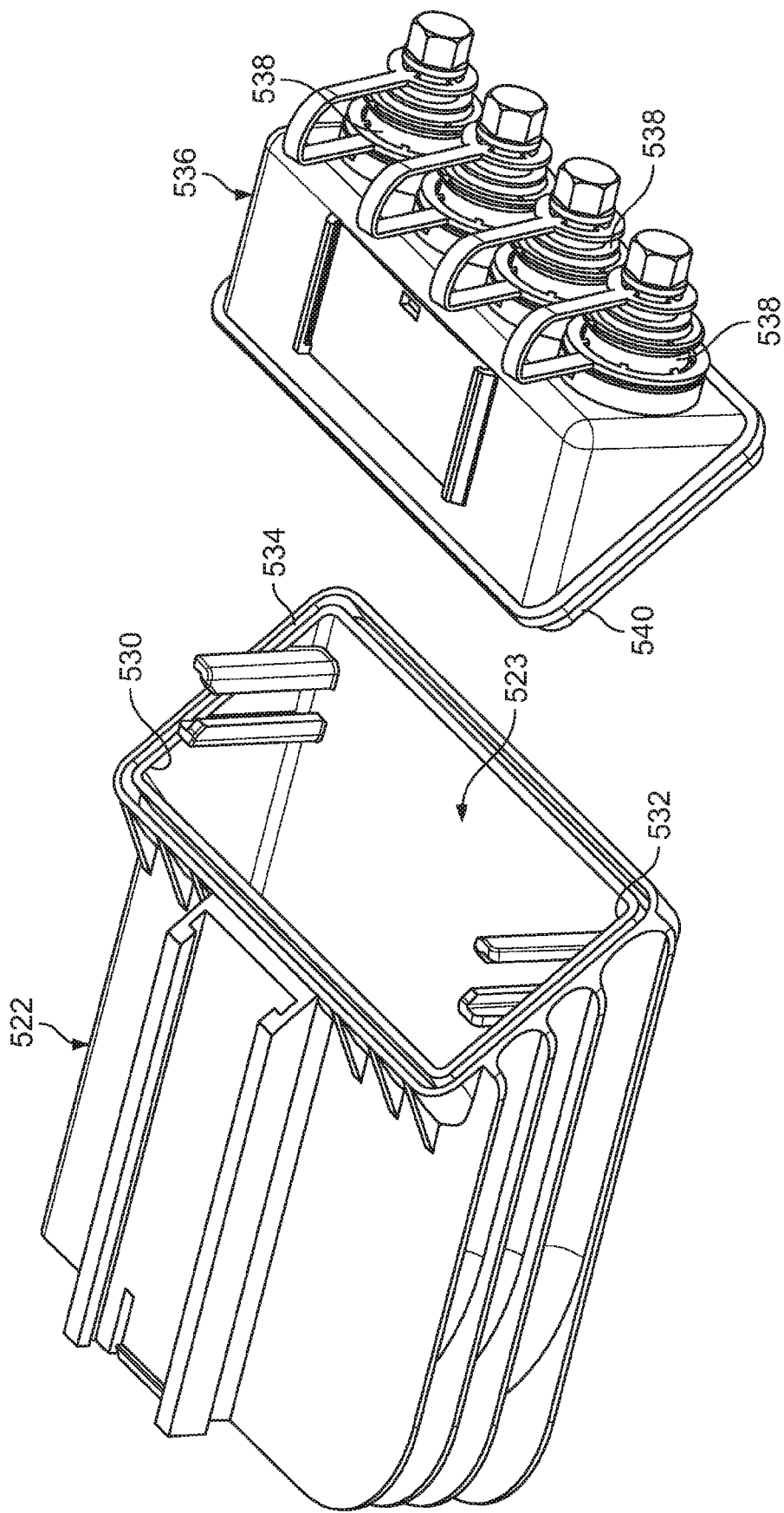
FIG. 18 is a front perspective view of an example telecommunications terminal including the adapter carrying piece of FIG. 17 shown exploded away from a housing in accordance with the principles of the present disclosure.
Figure 19:
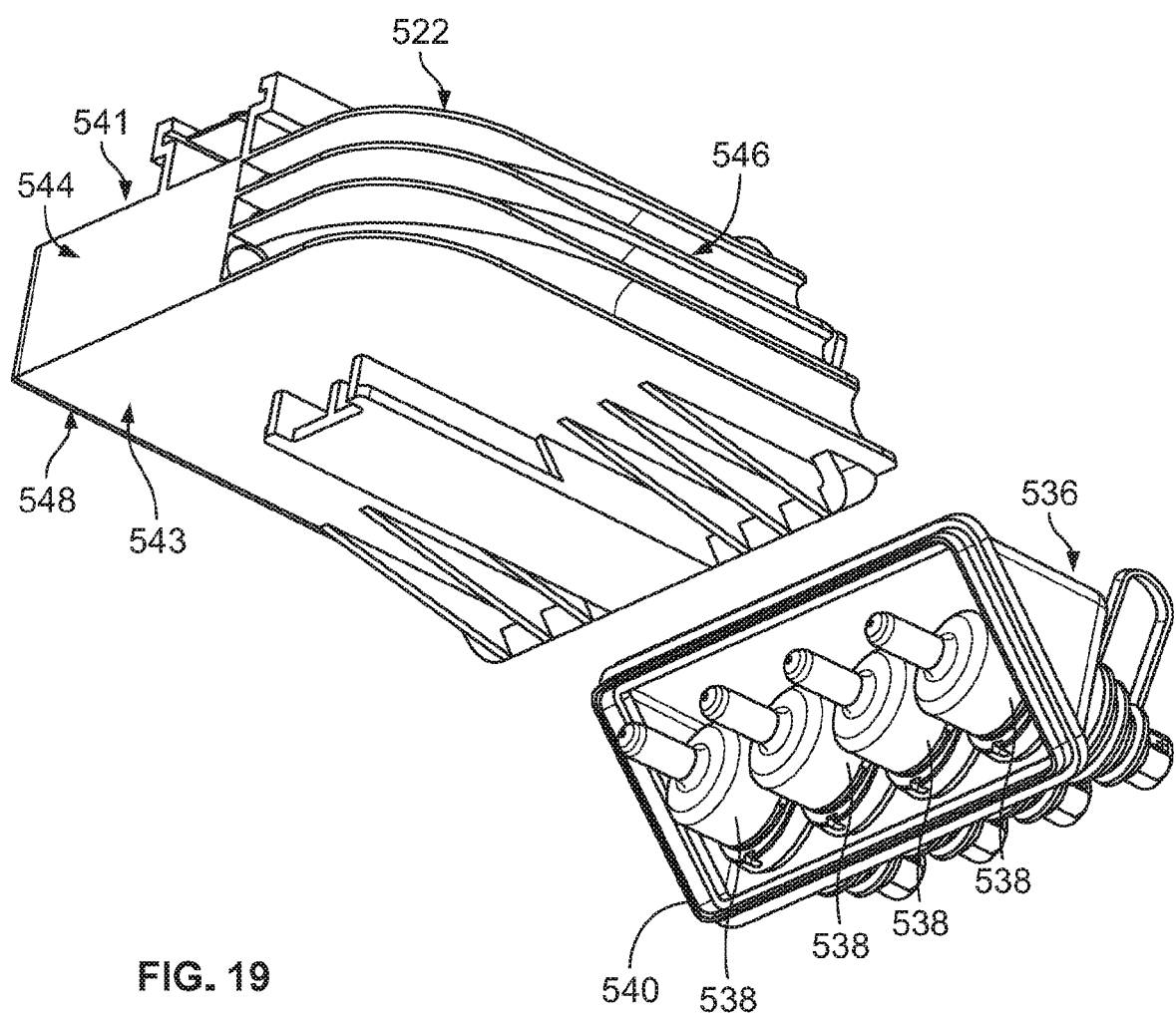
FIG. 19 is a rear perspective view of the telecommunications terminal of FIG. 18.
Figure 20:
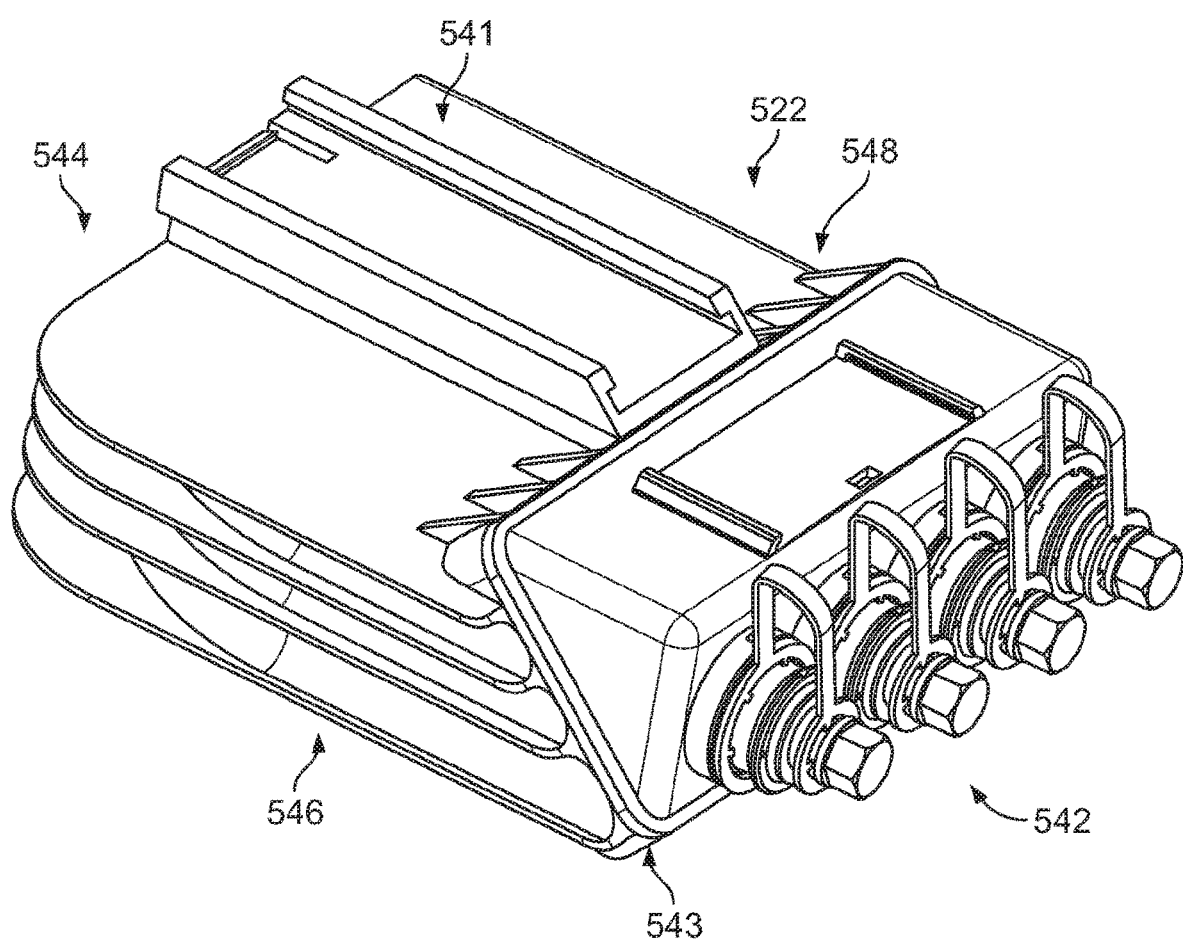
FIG. 20 is a perspective view of the assembled telecommunications terminal of FIG. 18.
Figure 21:
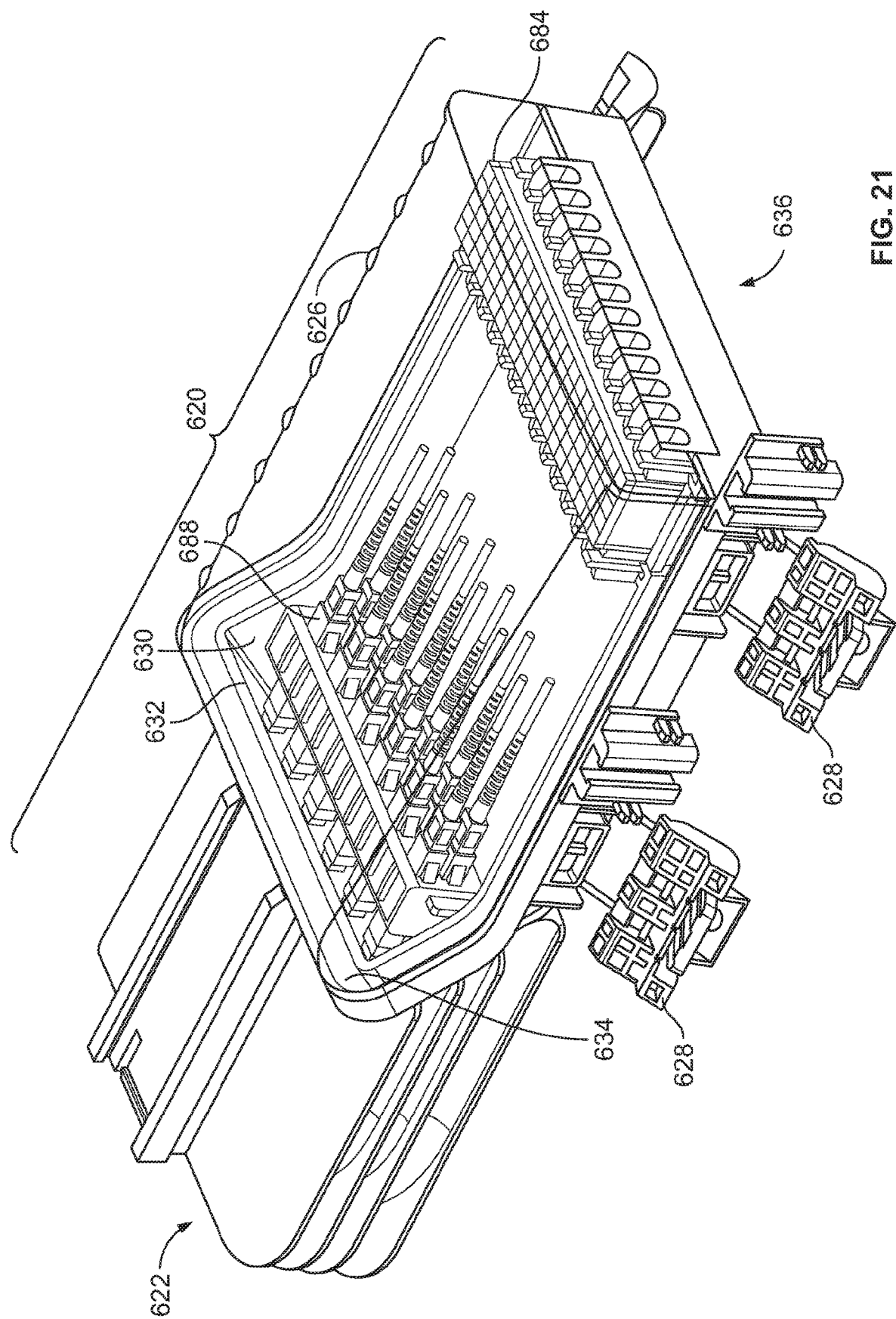
FIG. 21 is a front perspective view of another example telecommunications terminal including the adapter carrying arrangement mounted to a housing, the adapter carrying arrangement shown in phantom so that an interior of the adapter carrying arrangement is visible.

As shown in FIG. 17, an example adapter carrying piece 536 may include an indicia section 537 at which a label or other indicia can be disposed. In an example, the label or indicia may identify externally-facing ports defined by the fiber optic adapters 538.

Further details regarding the housing 522 can be found in co-pending U.S. patent application Ser. No. 62/747,810, filed on Oct. 19, 2018, and titled "Telecommunications Terminal with Stub Cable," the disclosure of which is hereby incorporated herein by reference in its entirety.

FIGS. 21-24 illustrate another example terminal 620 in accordance with the principles of the present disclosure. The telecommunications terminal 620 includes a housing 622 defining an interior. The housing 622 is the same or substantially the same as the terminal housing 522 of FIGS. 17-20. The housing 622 defines an opening 630 (e.g., a bottom opening) defined by a perimeter 632 (e.g., a generally rectangular perimeter). A mounting channel is defined within the perimeter and preferably extends around the opening 630.

The terminal 620 further includes a re-enterable enclosure 636 that attaches to the housing 622 over the opening 630 by a permanent, non-unitary connection. The re-enterable enclosure 636 is separately connected to the housing 622 by a separate permanent, non-unitary connection. Example permanent, non-unitary connections include adhesive bonding, heat sealing, welding (e.g., ultrasonic welding, laser welding, hot gas welding) and the like. Once the re-enterable enclosure 636 has been attached to the housing 622, the re-enterable enclosure 636 is integrated with the housing 622 and not intended to be removed. In certain examples, the re-enterable enclosure 636 can include a mounting projection or extension that that coincides generally with the perimeter of the opening 630 and is configured to fit within the channel to facilitate aligning the re-enterable enclosure 636 relative to the opening 630.

By non-unitary, it is meant that the main body of the housing 622 is not monolithically formed with the re-enterable enclosure 636 (i.e., the re-enterable enclosure is not unitarily molded in a one-piece, seamless construction with the housing 622). Instead, the seamed, permanent connections are made between the main body of the housing 622 and the re-enterable enclosure 636.

Figure 22:
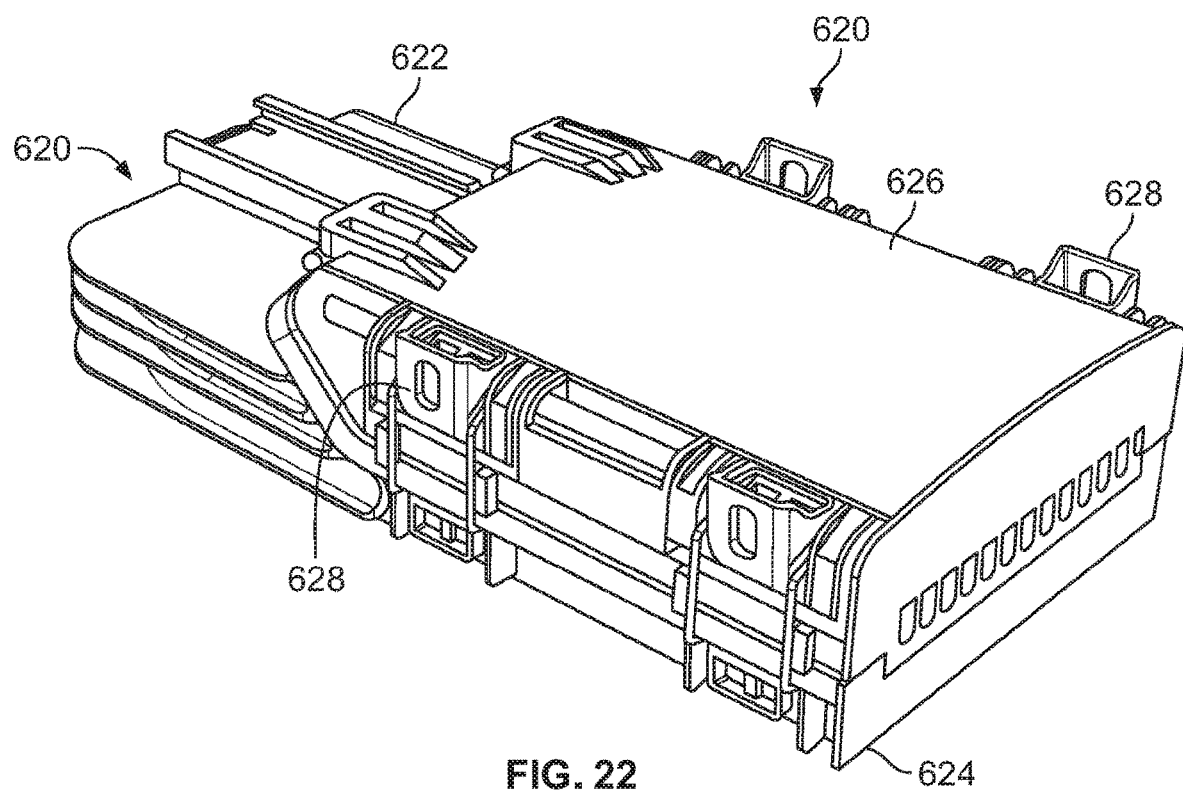
FIG. 22 is a front perspective view of the telecommunications terminal of FIG. 21 with none of the pieces shown in phantom.
Figure 23:
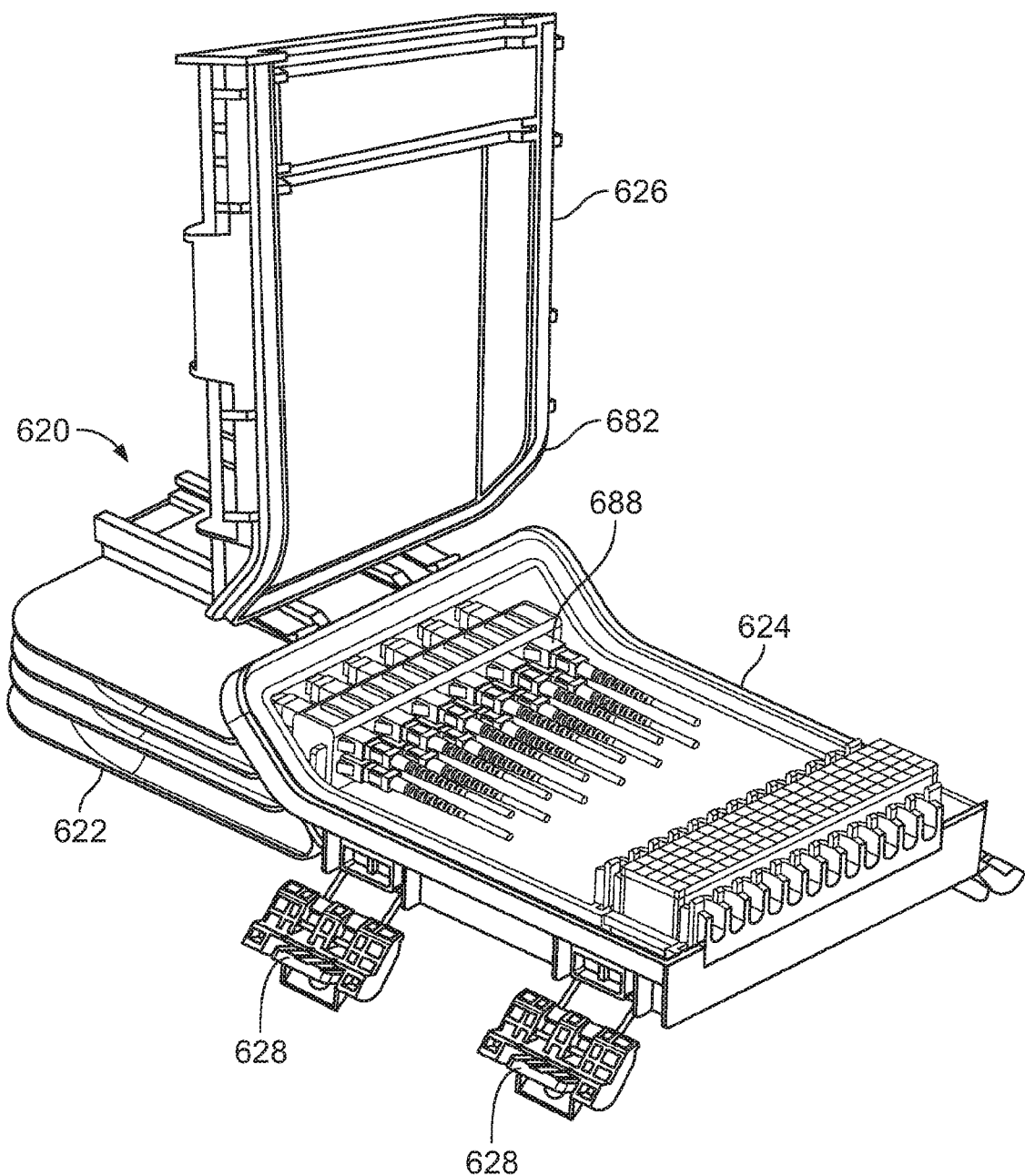
FIG. 23 is a perspective view of the telecommunications terminal of FIG. 21 with the cover shown in an open position, thereby providing access to the interior of the adapter carrying arrangement and to the non-hardened optical connectors.
Figure 24:
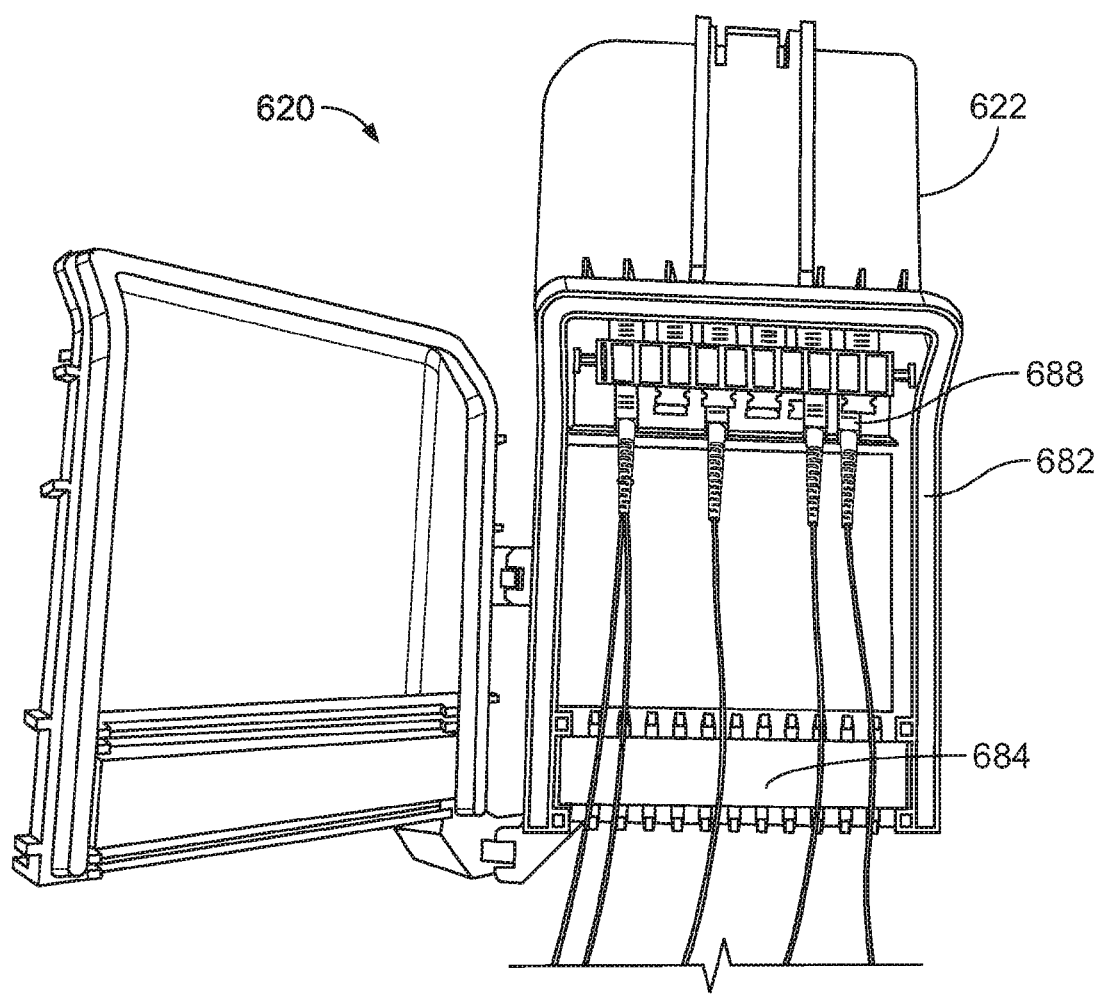
FIG. 24 is a front view of the telecommunications terminal of FIG. 23.

An example re-enterable enclosure 636 includes a first housing piece 624 and a second housing piece 626. The first and second housing pieces 624, 626 mate together when in a closed configuration (as shown at FIG. 22) to define an interior of the re-enterable enclosure 636. The first and second housing pieces 624, 626 are preferably movable relative to one another from the closed configuration to an open configuration to allow the interior of the housing to be accessed. In certain examples, the first and second housing pieces 624, 626 can be connected by a hinge that allows the first and second housing pieces 624, 626 to be pivoted between the closed configuration and the open configuration. In certain examples, the re-enterable enclosure 636 can include latches 628 for retaining the re-enterable enclosure 636 in the closed position. By opening the latches 628, the re-enterable enclosure 636 can be moved from the closed configuration to the open configuration.

In the depicted example, the first housing piece 624 cooperates with the housing 622 to define a base of the terminal 620 and the second housing piece 626 defines a front and/or top cover of the terminal 620. In an example, the base defines the rear of the terminal 620, which is adapted to face toward a structure to which the terminal 620 is intended to be mounted. The cover at least partially defines the front of the terminal 620.

In certain examples, a sealing arrangement such as a gasket seal or other type of perimeter seal can be provided between the first and second housing pieces 624, 626 to provide environmental sealing when the re-enterable enclosure 636 is in the closed configuration. For example, a first seal 682 (e.g., a rubber gasket, a gel seal, a foam seal, etc.) may extend along at least part of a perimeter of the first and/or second housing piece 624, 626 to seal between the first and second housing pieces 624, 626. A second seal 684 (e.g., a gel block, a foam block, a rubber gasket, etc.) extends along a bottom of the re-enterable enclosure 636. One or more fibers or fiber cables may extend into the re-enterable enclosure 636 through the second seal 684. In certain examples, the second seal 684 has a first part held by the first housing piece 624 and a second part held by the second housing piece 626 that cooperate to seal around the fibers and/or cables.

Communication components can be disposed within the re-enterable enclosure 636. In various examples, optical adapters, optical splices, passive optical splitters, wave division multiplexers and/or demultiplexers, cable management structures, or other such components can be disposed within the re-enterable enclosure 636. The seal arrangement of the re-enterable enclosure 636 protects the communication components from contaminants or environmental influence.

In some implementations, the re-enterable enclosure 636 includes an adapter carrying arrangement (e.g., adapter mounting arrangement, adapter module, adapter housing arrangement, etc.) to which a plurality of non-hardened fiber optic adapters 688 are secured. The non-hardened optical adapters 688 are environmentally protected by being disposed within the adapter carrying arrangement 636. The non-hardened optical adapters 688 may have a latching or snap-fit type mechanical connection interface. The non-hardened outer port of the adapters 688 do not include a seal or a sealing surface for providing a sealed connection when a non-hardened fiber optic connector is installed within the non-hardened outer port. Rather, the non-hardened fiber optic connectors are routed into and sealed within the adapter carrying arrangement 636. Accordingly, the connection between the non-hardened fiber optic connectors and the non-hardened optical adapters 688 need not be sealed.

Figure 25:
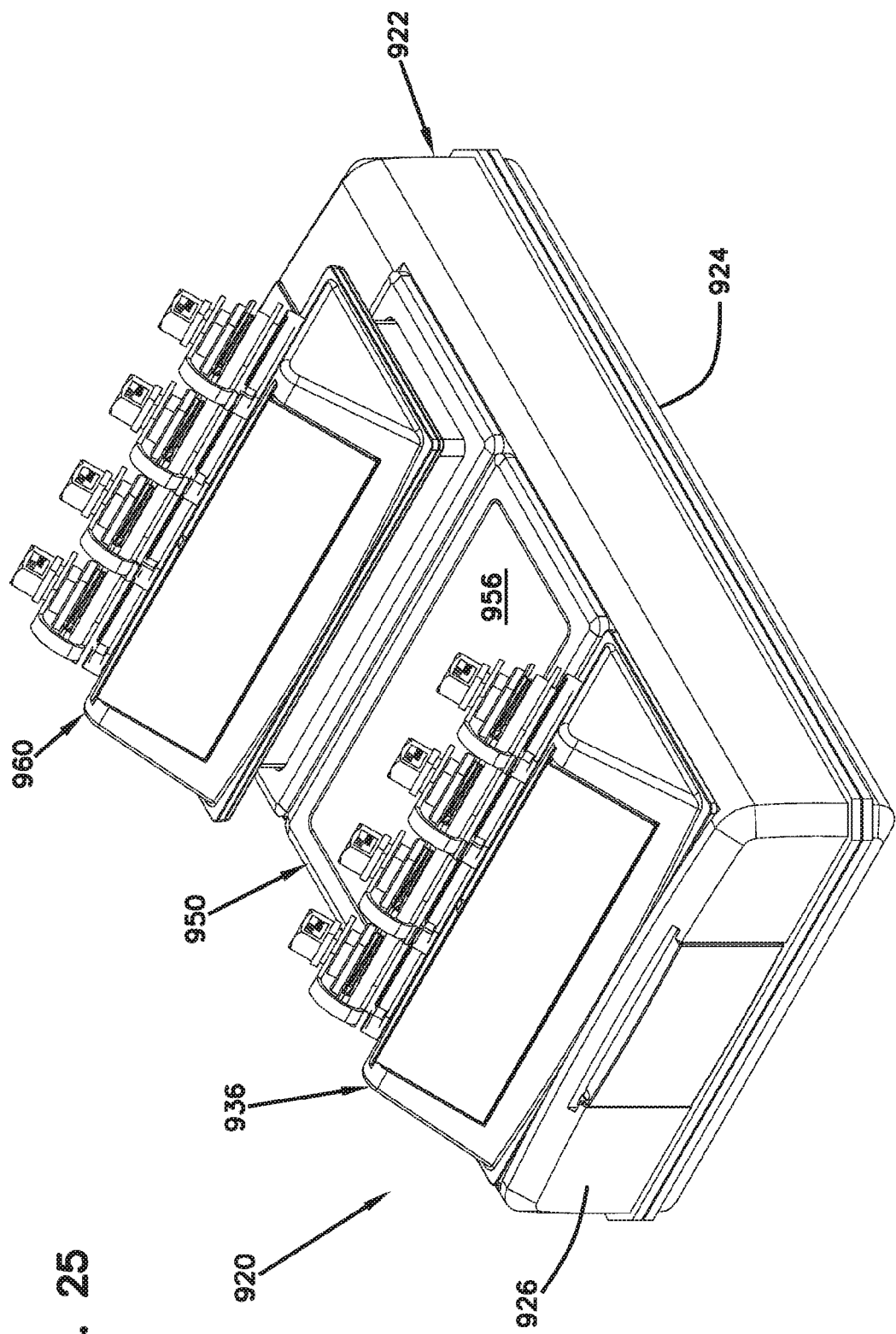
FIG. 25 is a front perspective view of another example telecommunications terminal including various adapter carrying arrangements or holders for receiving the same mounted to a housing.
Figure 27:
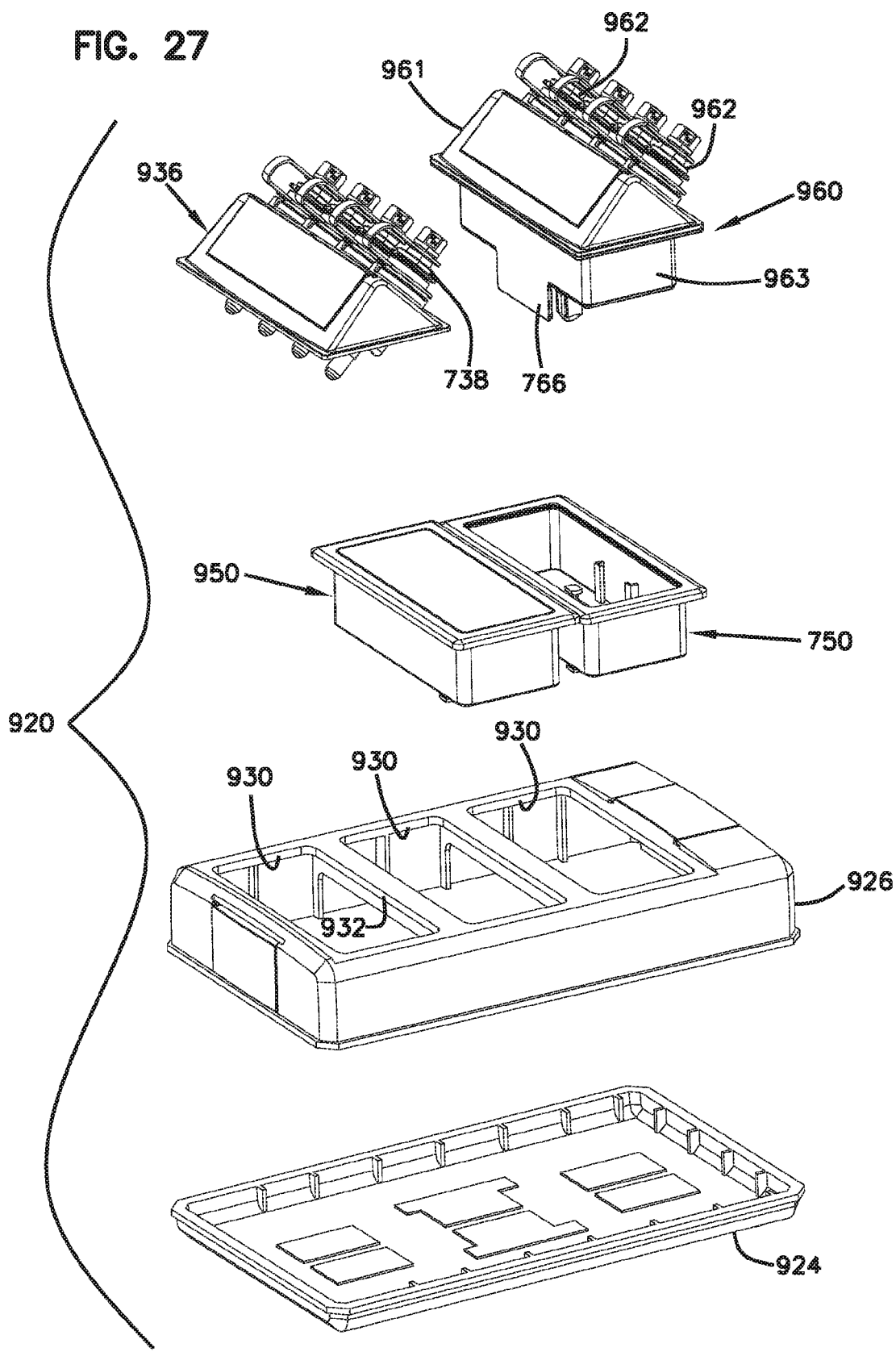
FIG. 27 is an exploded view of the terminal of FIG. 25.
Figure 28:
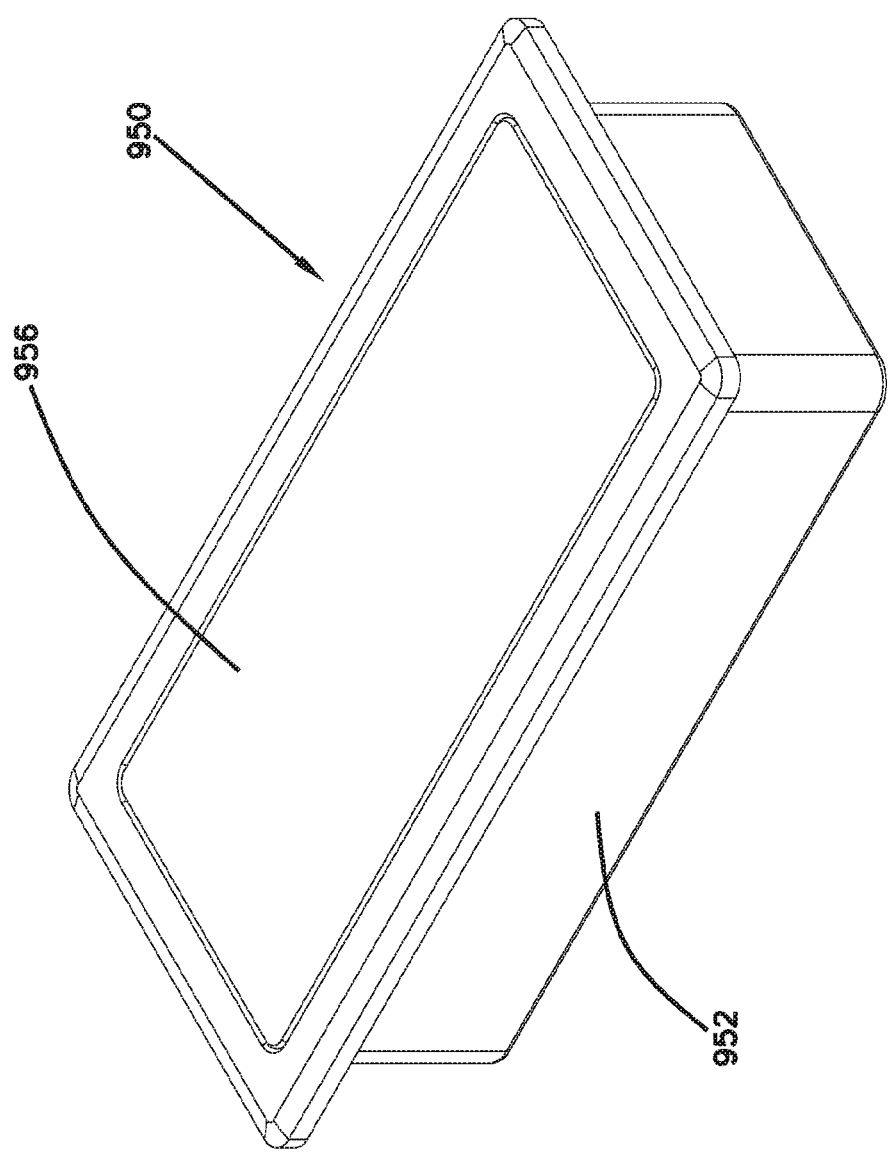
FIG. 28 is a front perspective view of an example module holder suitable for mounting to the housing of FIG. 25.
Figure 29:
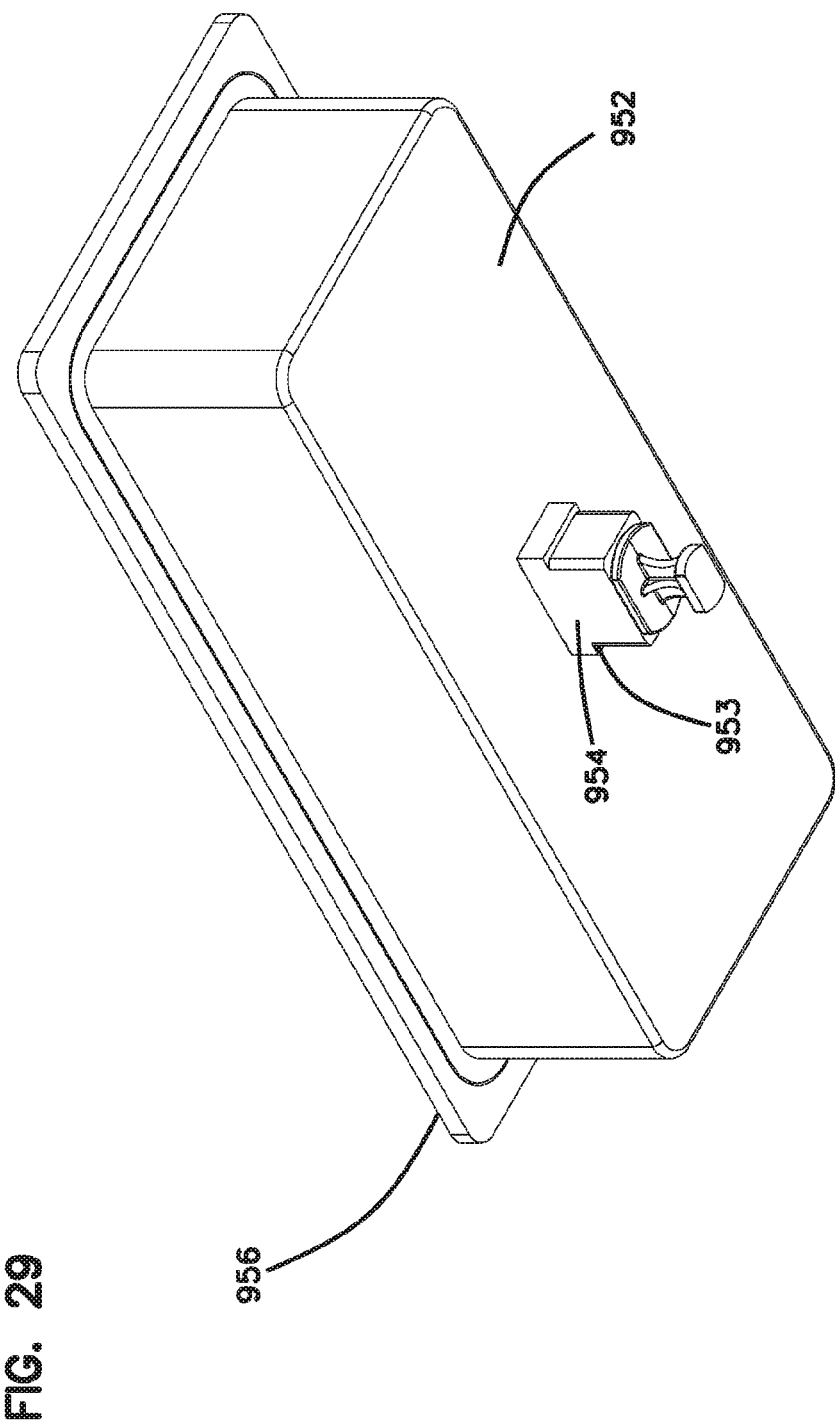
FIG. 29 is a rear perspective view of the module holder of FIG. 28.

FIG. 25 depicts a telecommunications terminal 920 in accordance with the principles of the present disclosure. The telecommunications terminal 920 includes a housing 922 defining an interior and an input 925. The housing 922 defines at least one opening, such as a front opening 930 (see FIG. 27). As depicted in FIG. 27, the housing 922 defines a plurality of front openings 930, such as three front openings 930. Various components (e.g., adapter carrying arrangements) can be installed at the front openings 930 of the terminal housing 922. Example adapter carrying arrangements include adapter carrying pieces 936 and telecommunication modules 960.

In some implementations, the input 925 includes an optical adapter having an outer port accessible from an exterior of the housing 922 and an inner port accessible from an interior of the housing 922. In such examples, a connectorized end of an input cable can be routed to the outer port and a connectorized pigtail can extend between the inner port and interior connection interfaces of the various components carried by the housing 922. In other implementations, the input 925 includes a gland or gasket that allows the input cable to extend into the housing 922. In such examples, the input cable can be spliced to the various components carried by the housing or otherwise optically coupled using a connection interface. In still other implementations, the input 925 includes a connectorized stub cable that extends outwardly from the housing 922.

In certain implementations, one or more adapter carrying pieces 936 are mounted to the housing 922 at the front openings 930. Examples of an adapter carrying piece are disclosed herein at reference numbers 36, 536. It will be appreciated that other adapter carrying pieces having different sizes and styles of fiber optic adapters also could be used to allow different terminals to be manufactured from the same base components of the housing 922.

In accordance with some aspects of the disclosure, one or more module holders 950 can be mounted to the housing 922 at the front openings 930. For example, each module holder 950 can be installed at a corresponding one of the front openings 930. A module, such as a telecommunications module 960, may subsequently be installed at the module holder 950. The module 960 may carry one or more optical adapters 962 (e.g., ruggedized optical adapters). In alternative examples, the module 960 may include multiple output tethers or output plug connectors carried with the module 960 instead of or in addition to the adapters 962.

Upon installation of the module 960, the optical adapters 962 of the module 960 are optically coupled to the input 925 of the terminal housing 922. For example, one or more module holders 950 may be mounted to the housing 922 at the factory before deployment of the terminal 920. The input 925 is optically coupled to a first connection interface 954 of the module holder 950. At a later time (e.g., after deployment of the terminal 920 in the field), a module 960 may be installed at the module holder 950 to provide connection interfaces at the terminal 920. A second connection interface 964 of the module 960 engages the first connection interface 954 of the module holder 950.

In certain implementations, blanks can be mounted over one or more of the front openings 930 instead of the adapter carrying arrangements. It will be appreciated that the blanks can include the same type of connection interface as the adapter carrying pieces 936. It will be appreciated that by using blanks, housings having reduced port counts can be manufactured using the same base components of the housing 922.

FIG. 27 depicts an exploded view of the terminal 920. As depicted, the housing 922 defines a plurality of front openings 930, such as three front openings 930. In the example shown, the terminal housing 922 has a first opening 930 receiving an adapter carrying piece 936, a second opening 930 receiving a first module holder 950, and a third opening 930 receiving a second module holder 950. A module 960 is mounted at the second module holder 950. The first module holder 950 is capped with a cover 956 until another module is to be installed at the module holder 950. Alternatively, each terminal 920 can be configured in the factory to have any desired combination of module holders 950, adapter carrying pieces 36, 536, 936, and/or blanks.

In certain implementations, the housing 922 includes a first housing piece 924 and a second housing piece 926 that mate together when in a closed configuration (as shown at FIG. 1) to define the interior of the housing 922. As shown at FIG. 27, the first housing piece 924 forms the base and the second housing piece 926 forms a front cover of the housing 922 that defines the one or more openings 930. In certain implementations, the housing 922 defines a sealed interior. In certain examples, a seal such as a gasket seal or other type of perimeter seal can be provided between the first and second housing pieces 924, 926 to provide environmental sealing when the housing 922 is in the closed configuration.

In certain implementations, the first and second housing pieces 924, 926 are movable relative to one another from the closed configuration to an open configuration to allow the interior of the housing 922 to be accessed. In certain examples, the first and second housing pieces 924, 926 can be connected by a hinge that allows the first and second housing pieces 924, 926 to be pivoted between the closed configuration and the open configuration. In some examples, the housing 922 can include temporary retaining members, such as latches or fasteners, for retaining the housing 922 in the closed position. In other examples, the housing 922 can be more permanently secured in the closed position, such as by adhesive or welding.

Figure 26:
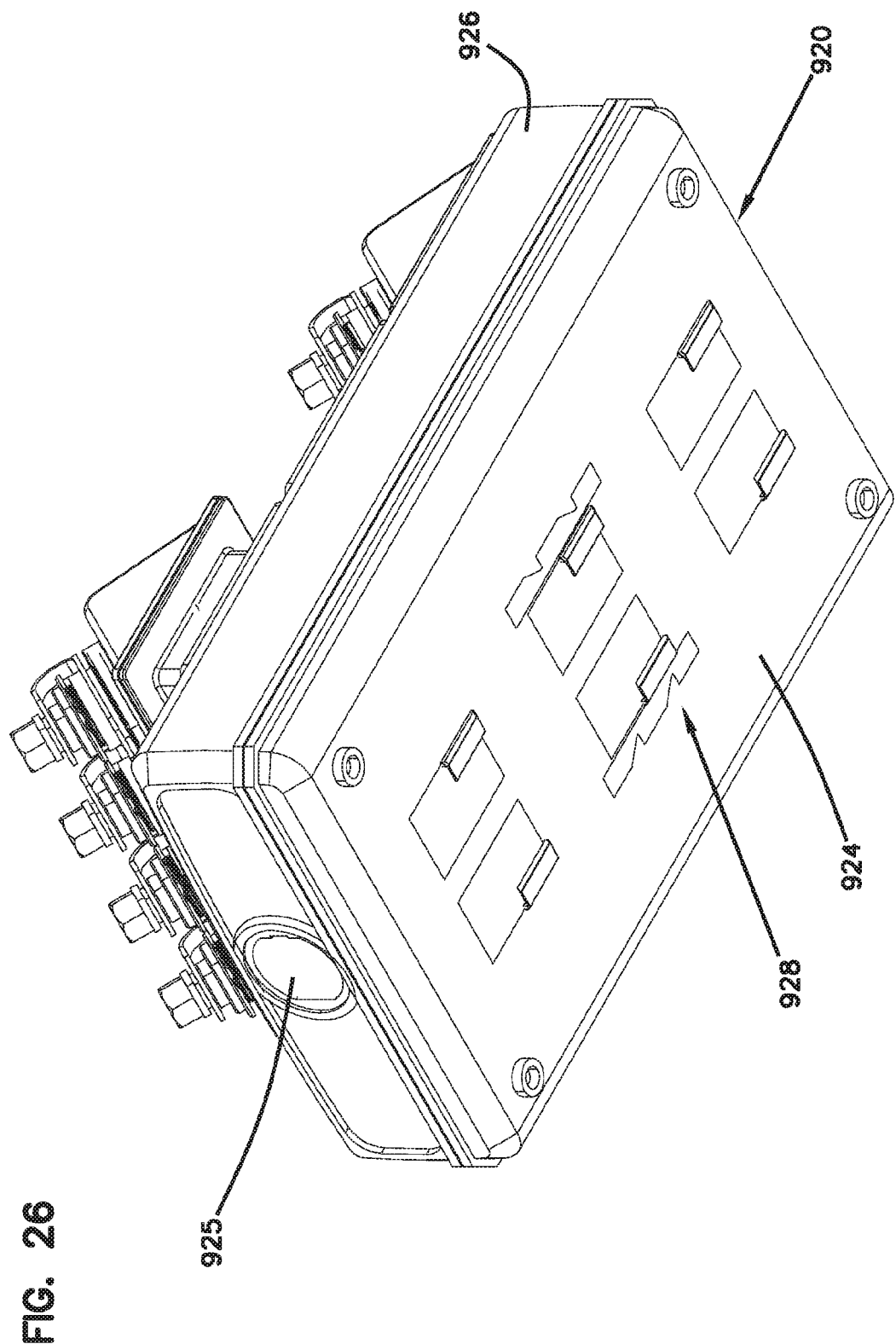
FIG. 26 is a rear perspective view of the terminal of FIG. 25.

In the depicted example, the first housing piece 924 is a base and the second housing piece 926 is front cover. In certain examples, the first housing piece 924 defines a back plane adapted to face toward a structure to which the terminal 920 is intended to be mounted while the second housing piece 926 define a front of the terminal 920. In certain examples, the first housing piece 924 can include structure 928 for mounting the terminal 920 to another structure (e.g., a pole, a wall, within a hand-hole, to a frame, or to other locations.) Example mounting structures 928 can include openings for receiving fasteners, mounting tabs defining fastener openings, brackets, structures for receiving brackets, strap receivers, and like structures. Suitable example mounting structures 928 (see FIG. 26) are disclosed in U.S. Provisional Appl. No. 62/807,008, filed Feb. 18, 2019, the disclosure of which is hereby incorporated herein by reference in its entirety.

Figure 34:
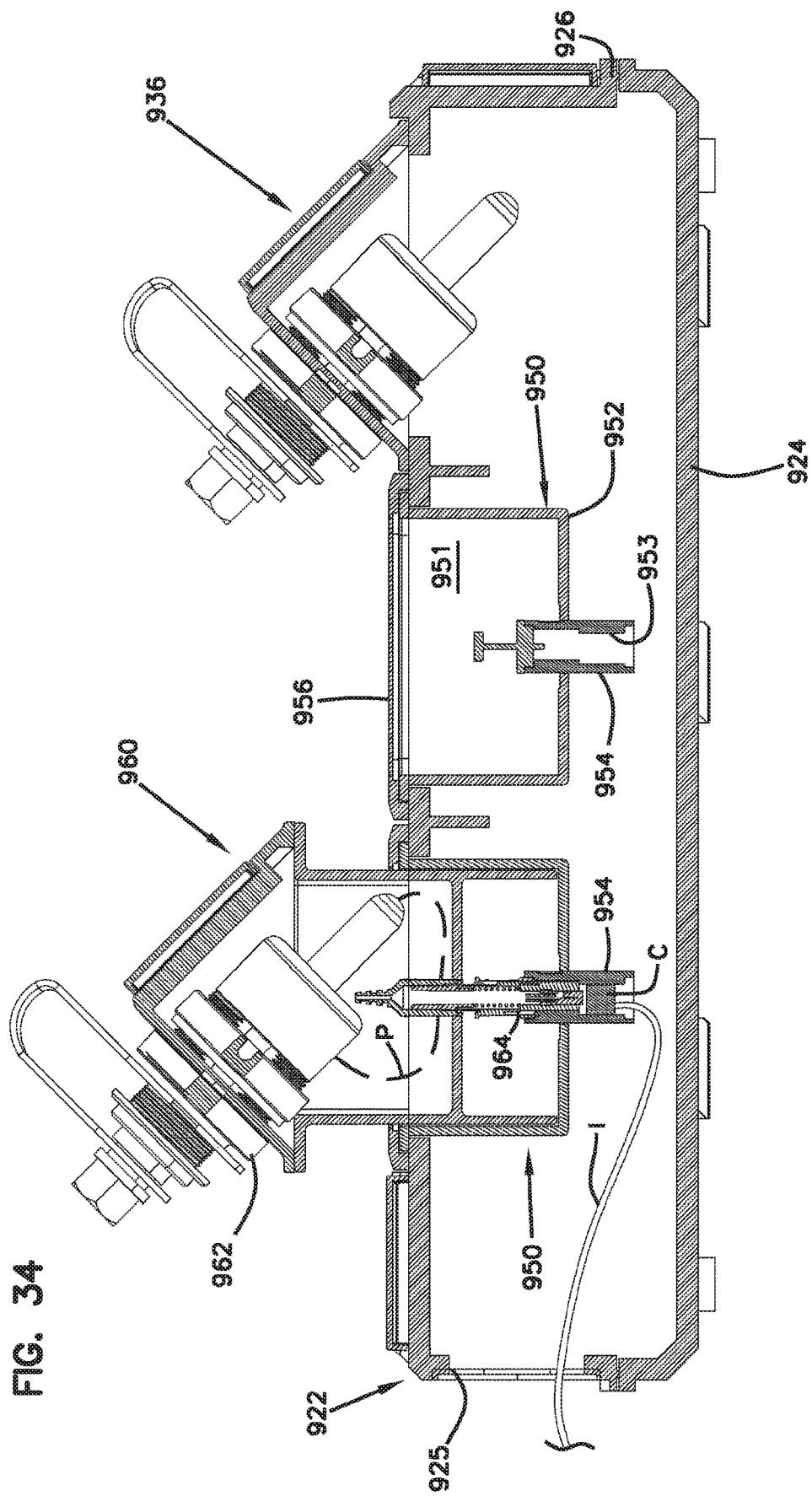
FIG. 34 is a cross-sectional view of the terminal of FIG. 25 showing the module holders and module mounted at the terminal housing.

In accordance with certain aspects of the disclosure, the module holder 950 and module 960 may be configured for a plug-and-play type connection. For example, the module holder 950 includes a first connection interface 954 to which an input fiber I within the terminal housing 922 is optically coupled. In certain examples, the input fiber I is coupled to the first connection interface 954 in the factory or otherwise prior to deployment of the terminal 920 in the field. The module 960 includes a second connection interface 964 configured to optically couple with the first connection interface 954 of the module holder 950 when the module 960 is received at the module holder 950. The second connection interface 964 also is optically coupled to the optical adapter(s) 962 carried by the module 960 (e.g., see pigtail fibers P schematically shown in FIG. 34). Accordingly, engaging the module 960 with the module holder 950 optically couples the input fiber I within the terminal housing 922 with the optical adapter(s) 962 of the module 960.

In some implementations, the first and second connection interfaces 954, 964 include single-fiber connection interfaces (e.g., SC plug and adapter, LC plug and adapter, etc.). In other implementations, the first and second connection interfaces 954, 964 include multi-fiber connection interfaces (e.g., MPO plug and adapter). The module 960 may include an interior optical circuit (e.g., a hydra cable, fibers routed on a flexible substrate, etc.) that connects the multi-fiber connection interface 964 to multiple single-fiber optical adapters 962.

In certain examples, the first and second connection interfaces 954, 964 are designed to mechanically mate with each other. In an example, the first connection interface 954 includes an optical adapter and the second connection interface 962 includes an optical plug connector. The optical adapter 954 has a first port 953 accessible from within the terminal housing 922 and a second port 955 accessible from within the module holder 950. A connectorized end C of the input fiber I plugs into the first port 953 and the optical plug connector 962 of the module 960 plugs into the second port 955 (see FIG. 34). In another example, the first connection interface 954 includes a female optical connector carried by the holder body 952. In other examples, the first connection interface 854 includes a plug connector carried by the holder body 952 and the second connection interface includes an optical adapter or female connector. In certain examples, the first connection interface 954 and/or the second connection interface 964 may include a stub cable terminated by a plug connector or female optical connector.

Figure 30:
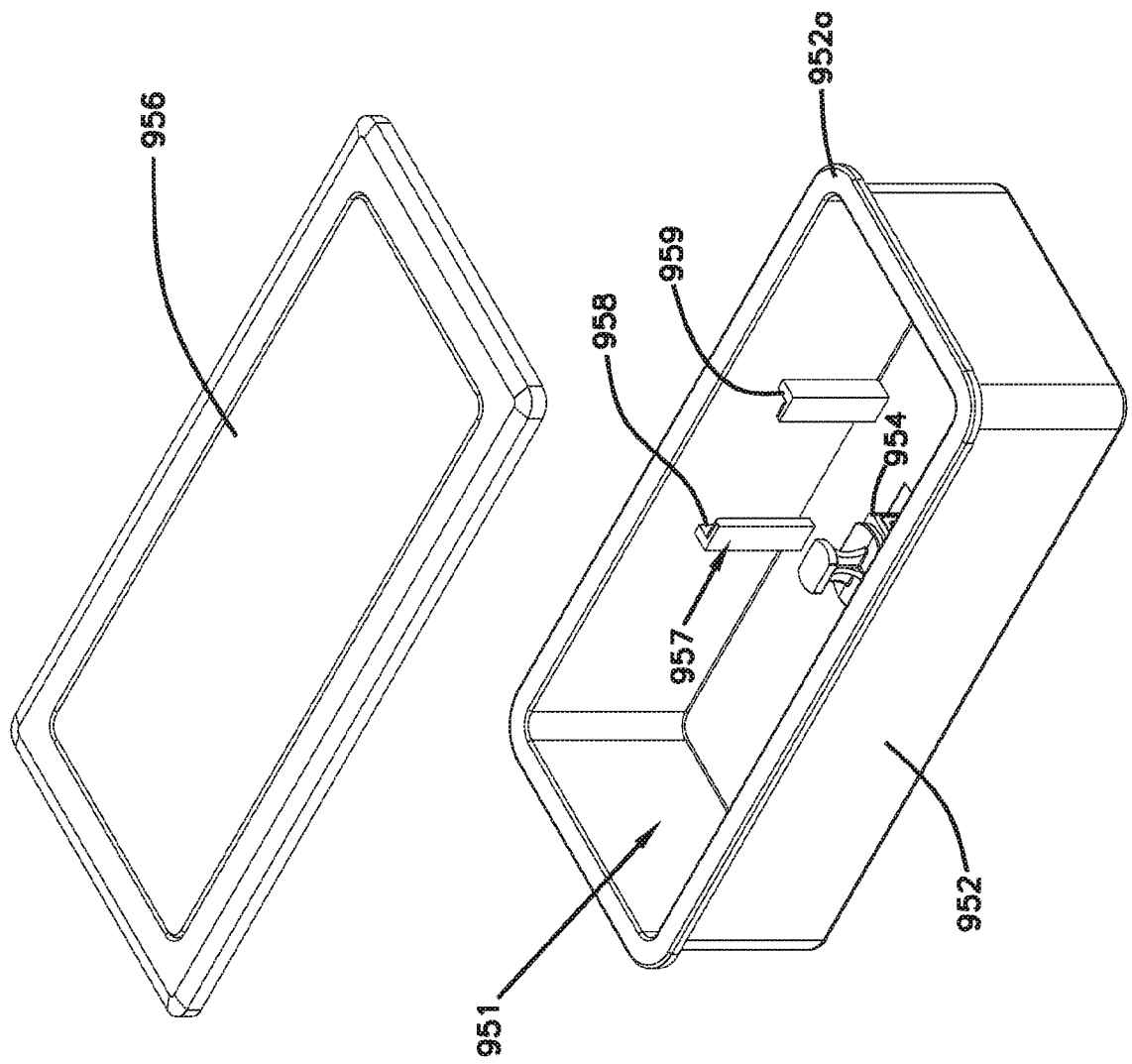
FIG. 30 is an exploded view of the module holder of FIG. 28.
Figure 31:
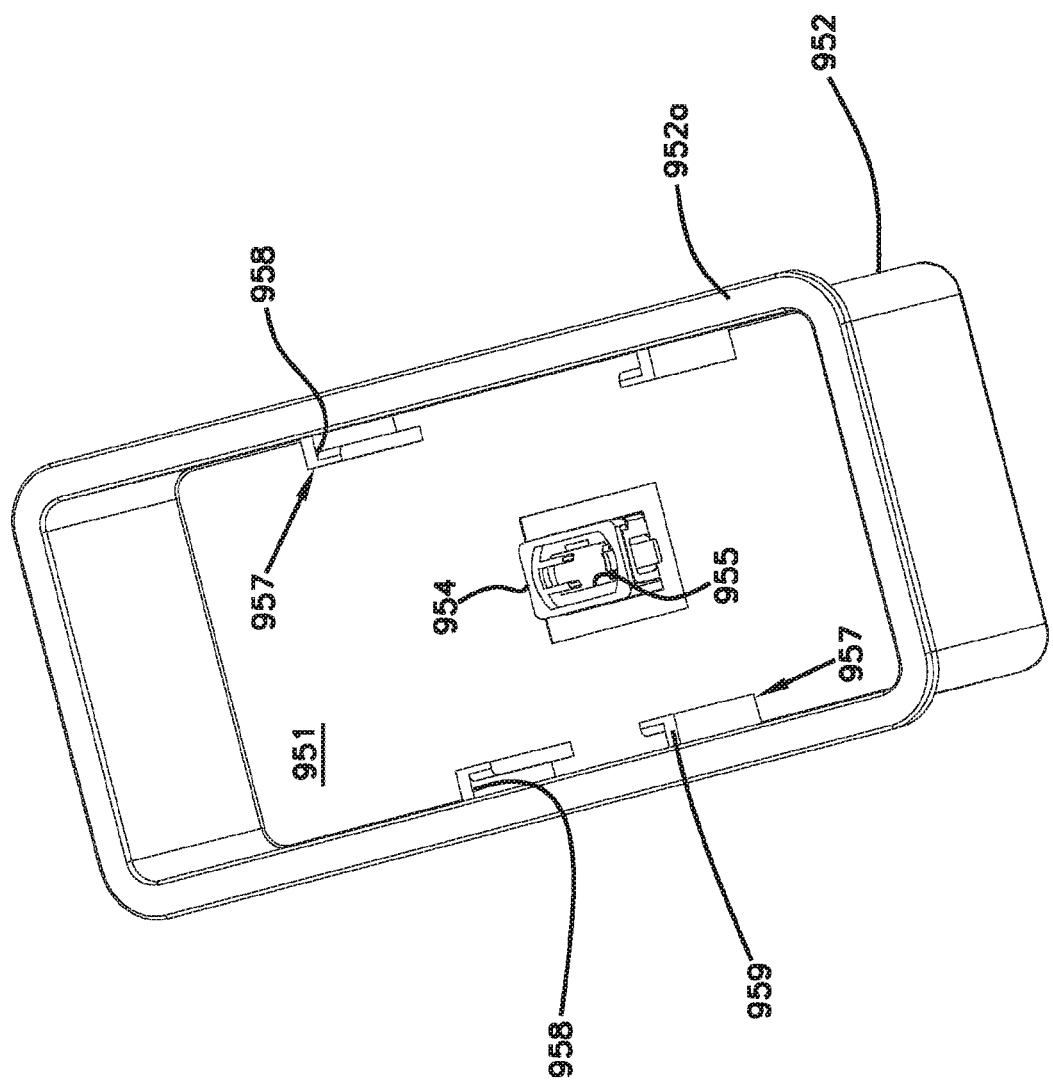
FIG. 31 is a perspective view of the module holder of FIG. 28 with a cover removed for ease in viewing the pocket.

In certain implementations, the module holder 950 includes a body 952 defining an interior pocket 951 accessible through an open end of the body 952. The first connection interface 954 is disposed within the pocket 951 and is accessible through the open end of the body 952. For example, when the first connection interface 954 is an optical adapter, the second port 955 is accessible from within the pocket 951 (see e.g., FIGS. 30 and 31). The body 952 extends at least partially into the front opening 930 defined in the housing 922 when the module holder 950 is installed at the terminal 920. Accordingly, the pocket 951 extends at least partially into the terminal housing 922. In certain examples, the body 952 has a lip 952a that extends around the front opening 930. In some examples, the lip 952a extends over the front of the housing 922 when the module holder 950 is disposed at the front opening 930. In other examples, the lip 952a extends over the recessed surface defined around the opening 930 when the module holder 950 is disposed at the front opening 930.

In certain implementations, the body 952 of the module holder 950 is secured to the terminal housing 922 by a separate permanent, non-unitary connection. By non-unitary, it is meant that the terminal housing 922 is not monolithically formed with the module holder 950 (i.e., the module holder is not unitarily molded in a one-piece, seamless construction with the housing 922). Instead, the seamed, permanent connections are made between the housing 922 and the module holder 950. Example permanent, non-unitary connections include adhesive bonding, heat sealing, welding (e.g., ultrasonic welding, laser welding, hot gas welding) and the like. Further information on suitable permanent, non-unitary connection techniques can be found in U.S. Pat. No. 7,753,596 and U.S. Pat. No. 7,302,152, the disclosures of which are hereby incorporated herein by reference in their entirety. Once the module holder 950 has been attached to the housing 922, the module holder 950 is integrated with the housing 922 and is not intended to be removed.

In certain implementations, a cover 956 is mounted over the pocket 951 of the module holder 950 when a module 960 is not received at the module holder 950. The cover 956 extends over the open end of the pocket 951 to block access to the first connection interface 954 from an exterior of the terminal housing 922. In certain examples, the cover 956 is sealingly connected to the body 952 of the module holder 950 (e.g., to form an environmental seal between the pocket and the exterior of the terminal 920). In certain examples, dust caps may be received at the first and second ports 953, 955 of the first connection interface 954.

Figure 32:
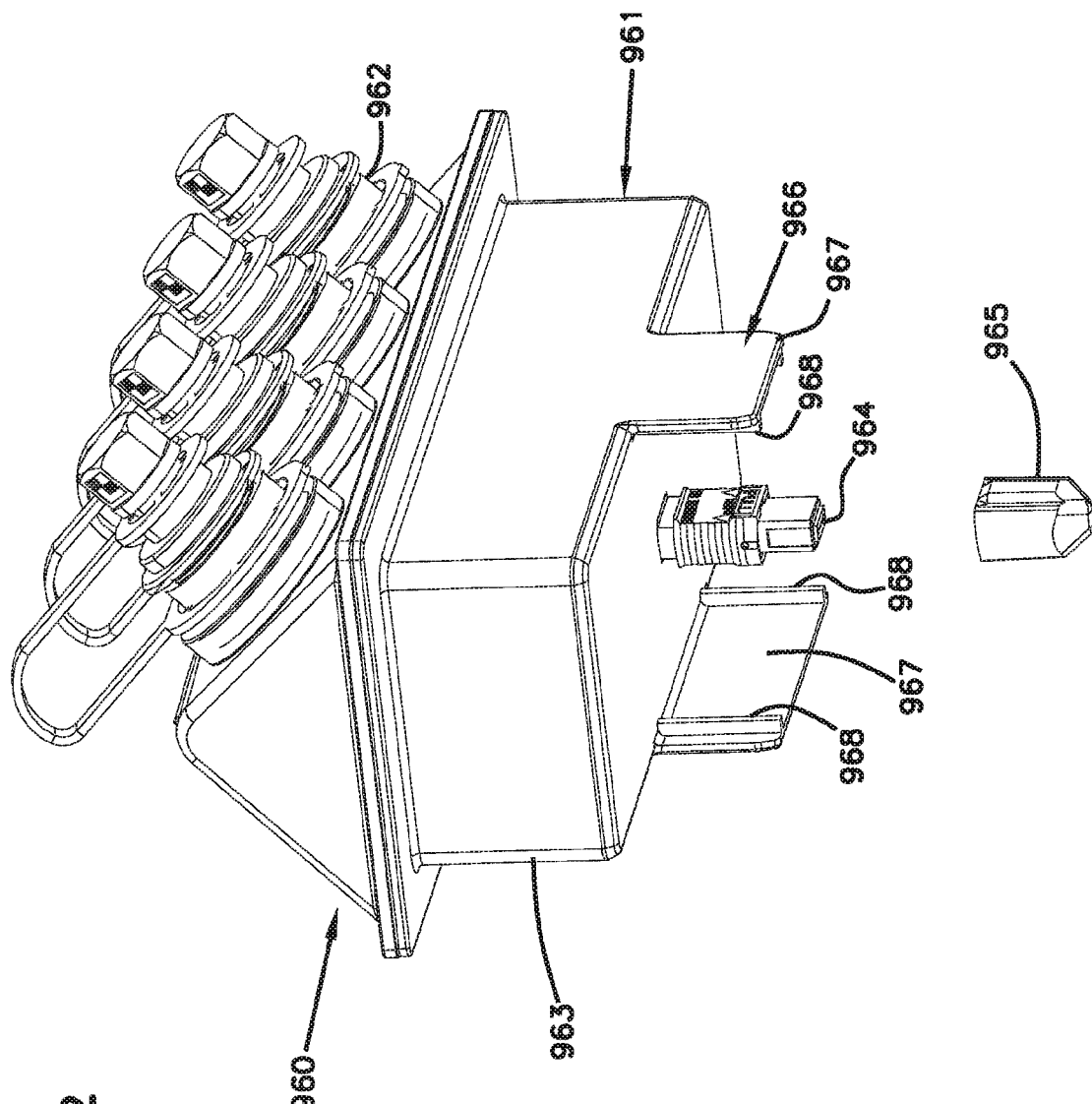
FIG. 32 is a perspective view of an example module suitable for being received at the module holder of FIGS. 28-31.
Figure 33:
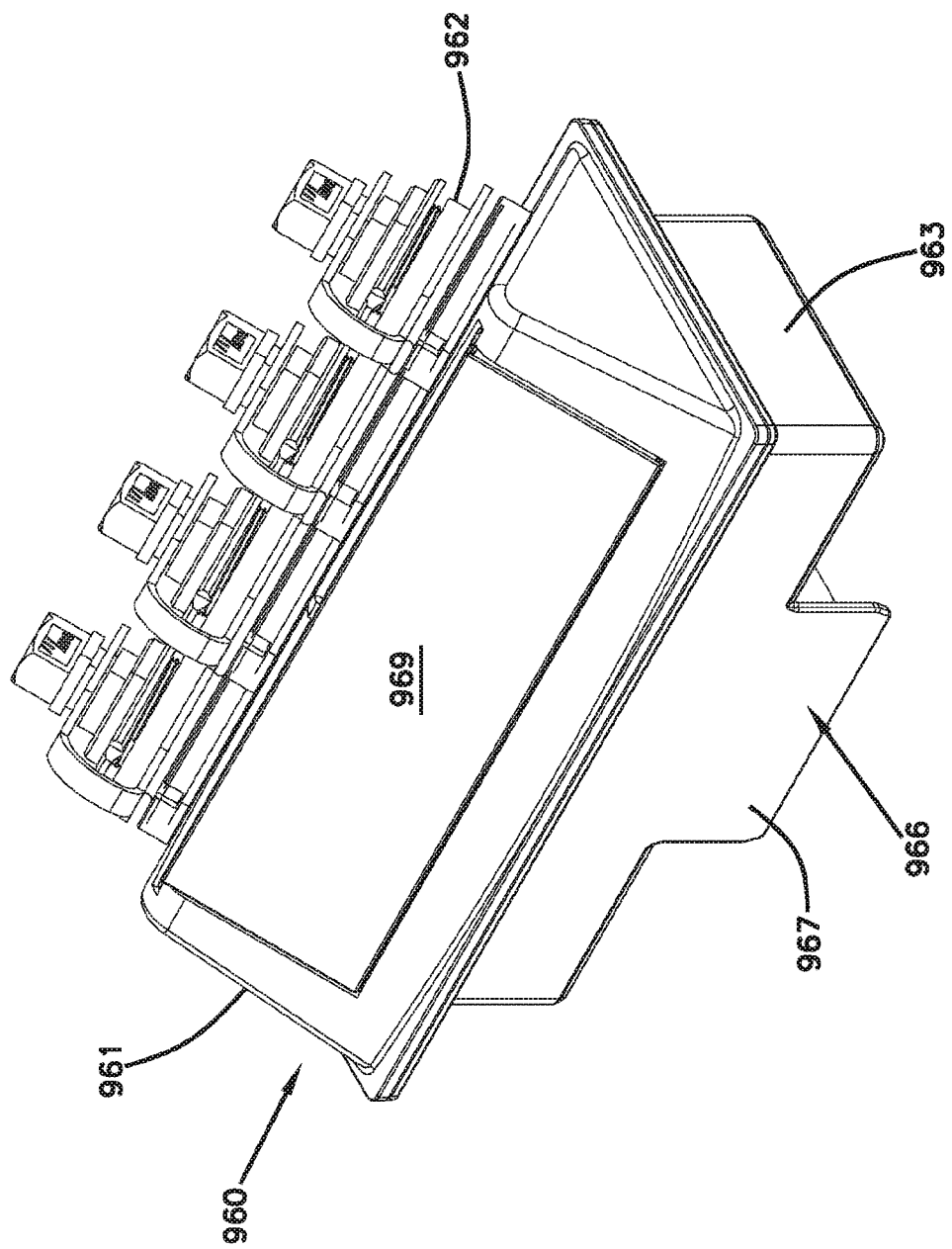
FIG. 33 is another perspective view of the module of FIG. 32.

FIGS. 32 and 33 illustrate an example module 960 suitable to be received by the module holder 950. The module 960 includes a body 961 having a portion 963 sized and shaped to extend into the pocket 951 of the module holder 950. In the example shown, another portion of the module body 961 is disposed external of the pocket 951. In certain implementations, the module body 961 carries one or more optical adapters 962 having outer ports accessible from an exterior of the module 960. The outer ports may be ruggedized. In the example shown, the outer ports are disposed external of the pocket 951.

In certain implementations, the second connection interface 964 is carried at a different end of the module body 961 from the optical adapters 962. For example, the second connection interface 964 faces in a first direction and the outer ports of the optical adapters 962 face at least partially in an opposite, second direction. A dust cap 965 may be disposed over the second connection interface 964 during shipping and removed just prior to installing the module 960 at the module holder 950.

In certain implementations, the connection between the first and second connection interfaces 954, 964 is environmentally sealed. In some implementations, the second port 955 of the adapter 954 and the plug 964 are both ruggedized to form an environmental seal therebetween when the module 960 is received at the module holder 950. In other examples, the second port 955 of the adapter 954 and the plug 964 are not ruggedized. In certain such examples, the module body 961 seals to the holder body 952. For example, one of the module body 961 and the holder body 952 may carry a gasket while the other of the module body 961 and the holder body 952 defines a sealing surface against which the gasket presses when the module 960 is installed at the module holder 950.

In certain implementations, the module holder 950 and module 960 are configured to mechanically engage each other separate from the optical connection interfaces 954, 964. In certain examples, the module holder 950 includes a first retention arrangement 957 and the module 960 includes a second retention arrangement 966 that are configured to engage each other to aid in aligning the module 960 within the module holder 950 and/or to aid in retaining the module 960 within the module holder 950.

In the example shown, the first retention arrangement 957 includes retention members disposed within the pocket 951 to define channels 958 at interior surfaces of the module holder body 952. The second retention arrangement 966 includes flanges 967 sized and shaped to fit (e.g., slidingly fit) in the channels 958. The retention members also define shoulders 959 on which the body 961 of the module 960 seats (e.g., see FIG. 34). Accordingly, the retention members help space the module 960 relative to the module holder 950 so that the first and second connection interfaces 954, 964 engage. In certain examples, the shoulders 959 assist in supporting the module 960. In certain examples, bottoms of the module flanges 967 seat on the bottom surface of the pocket 951 to support the module 960.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A telecommunications terminal comprising:
a housing including a first housing piece and a second housing piece that mate together when in a closed configuration to define an interior of the housing, the first and second housing pieces being moveable relative to one another from the closed configuration to an open configuration to allow the interior of the housing to be accessed;
the second housing piece defining a first opening, and wherein the second housing piece also defines a second opening covered by a blank piece that does not include any hardened fiber optic adapters, the blank piece being attached to the second housing piece by a permanent, non-unitary connection; and
an adapter carrying piece to which a plurality of hardened fiber optic adapters are secured, the adapter carrying piece being attached to the second housing piece over the opening of the second housing piece by a permanent, non-unitary connection.

2. The telecommunications terminal of claim 1, further comprising a perimeter seal provided between the first and second housing pieces.

3. The telecommunications terminal of claim 1, further comprising a hinge that pivotally connects the first and second housing pieces together.

4. The telecommunications terminal of claim 1, further comprising latches for holding the first and second housing pieces in the closed configuration.

5. The telecommunications terminal of claim 1, wherein the permanent, non-unitary connection includes a seam that extends about a perimeter of the adapter carrying piece and about a perimeter of the opening.

6. The telecommunications terminal of claim 1, wherein the permanent, non-unitary connection includes an adhesive bond or a weld.

7. The telecommunications terminal of claim 1, wherein one of the adapter carrying piece and the second housing piece defines a mounting channel that extends around the opening, and wherein the other of the adapter mounting piece and the second housing piece defines a mounting portion that fits within the mounting channel and that also extends about the opening.

8. The telecommunications terminal of claim 1, wherein the first housing piece is a base having means for mounting to telecommunications terminal to another structure, and the second housing piece is a cover.

9. The telecommunications terminal of claim 8, wherein the first housing piece defines a back of the housing and the second housing piece defines a front of the housing, and wherein the opening is at the front of the housing.

10. The telecommunications terminal of claim 1, wherein the adapter carrying piece can be attached in a first orientation over the opening in which outer ports of the fiber optic adapters face in a first direction, and wherein the adapter carrying piece can be attached in a second orientation over the opening in which outer ports of the fiber optic adapters face in a second direction different from the first direction.

11. The telecommunications terminal of claim 10, wherein the first and second orientations are rotated 180 degrees relative to one another.

12. The telecommunications terminal of claim 11, wherein the first and second directions are 90 degrees apart from one another.

13. The telecommunications terminal of claim 9, wherein the housing includes first and second opposite ends, and wherein the adapter carrying piece includes a face at which the hardened fiber optic adapters are mounted that is angled relative to the front of the housing such that outer ports of the hardened fiber optic adapters face at least partially toward one of the first and second opposite ends.

14. The telecommunications terminal of claim 13, wherein at least one of the first and second opposite ends defines one or more sealed cable pass-through locations.

15. The telecommunications terminal of claim 13, wherein the faces are either oblique or perpendicular relative to the front of the housing.

16. The telecommunications terminal of claim 13, wherein the faces are angled about 45 degrees relative to the front of the housing.

17. The telecommunications terminal of claim 13, wherein the perimeter of the opening is oriented along a plane that is parallel to the front of the housing and/or parallel to a back plane of the housing.

18. The telecommunications terminal of claim 13, wherein the perimeter of the opening is oriented along a plane that is oblique relative to the front of the housing and/or oblique relative to a back plane of the housing.

19. A telecommunications terminal comprising:
a housing including a first housing piece and a second housing piece that mate together when in a closed configuration to define an interior of the housing, the first and second housing pieces being moveable relative to one another from the closed configuration to an open configuration to allow the interior of the housing to be accessed;
the second housing piece defining a first opening covered by a first hardened fiber optic adapter carrier to which a plurality of hardened fiber optic adapters are secured, wherein the second housing piece also defines a second opening covered by a second hardened fiber optic adapter carrier to which a plurality of hardened fiber optic adapters are attached, wherein the first and the second hardened fiber optic carrier is attached to the second housing piece over the first and second openings by a permanent, non-unitary connection.

20. The telecommunications terminal of claim 19, wherein the second housing piece also defines a third opening covered by a third hardened fiber optic adapter carrier to which a plurality of hardened fiber optic adapters are attached, wherein the third hardened fiber optic adapter carrier is attached to the second housing piece by a permanent, non-unitary connection.

21. The telecommunications terminal of claim 20, wherein the second housing piece also defines a fourth opening covered by a fourth hardened fiber optic adapter carrier to which a plurality of hardened fiber optic adapters are attached, wherein the fourth hardened fiber optic adapter carrier is attached to the second housing piece by a permanent, non-unitary connection.

22. The telecommunications terminal of claim 1, wherein the hardened fiber optic adapter carrier includes a molded plastic piece to which the hardened fiber optic adapters are secured.

23. The telecommunications terminal of claim 1, wherein the first and second housing pieces are each separately molded plastic pieces.

* * * * *